US008693871B2

(12) United States Patent
de Carvalho Resende et al.

(10) Patent No.: US 8,693,871 B2
(45) Date of Patent: Apr. 8, 2014

(54) SYSTEM FOR ROUTING AND WAVELENGTH ASSIGNMENT IN WAVELENGTH DIVISION MULTIPLEXING OPTICAL NETWORKS

(75) Inventors: Mauricio Guilherme de Carvalho Resende, Holmdel, NJ (US); Thiago Ferreira de Noronha, Belo Horizonte (BR); Celso C. Ribeiro, Rio de Janeiro (BR)

(73) Assignee: AT&T Intellectual Property I, L.P., Atlanta, GA (US)

( * ) Notice: Subject to any disclaimer, the term of this patent is extended or adjusted under 35 U.S.C. 154(b) by 808 days.

(21) Appl. No.: 12/317,401

(22) Filed: Dec. 23, 2008

(65) Prior Publication Data

US 2010/0158528 A1 Jun. 24, 2010

(51) Int. Cl.
*G02F 1/00* (2006.01)
*H04J 14/02* (2006.01)

(52) U.S. Cl.
USPC .................. 398/79; 398/66; 398/67; 398/68; 398/69; 398/43; 398/5

(58) Field of Classification Search
USPC .......................................... 398/39, 68, 66, 43
See application file for complete search history.

(56) References Cited

U.S. PATENT DOCUMENTS

| 5,659,739 A * | 8/1997 | Lubbers et al. ........................ 1/1 |
| 2005/0069314 A1 * | 3/2005 | De Patre et al. .................. 398/5 |
| 2006/0004714 A1 * | 1/2006 | Popescu ............................ 707/3 |
| 2009/0077123 A1 * | 3/2009 | Gibson et al. ............. 707/103 Y |

OTHER PUBLICATIONS

Ramalingam ["An Incremental Algorithm for Generalization of Shortest Path Problem", Journal of Algorithms vol. 21, No. 2, pp. 267-305, 1996].*
Horowitz [Fundamantals of Data structures].*
A Practical Approach for Routing and Wavelength Assignment in Large Wavelength-Routed Optical Networks; Dhritiman Banerjee, et al.; Dept. of Computer Science, University of California, Davis, CA; revised Sep. 25, 1995; pp. 1-14.
Wavelength Assignment and Routing in WDM Networks; Esa Hyytia, et al.; Laboratory of Telecommunications Technology; Helsinki University of Technology, Finland; Jun. 1998.
The Partition Coloring Problem and Its Application to Wavelength Routing and Assignment; Guangzhi Li, et al.; Department of Computer Science, College of William and Mary, Williamsburg, VA; 2000.
Routing and Wavelength Assignment by Partition Colouring; Thiago F. Noronha, et al.; European Journal of Operational Research; 2006; pp. 797-810.
A Hybrid Genetic Algorithm for the Weight Setting Problem in OSPF/IS-IS Routing; L. S. Buriol, et al.; Networks, 2005; pp. 36-56.
Routing and Wavelength Assignment in Optical Networks Using Bin Packing Based Algorithms; Nina Skorin-Kapov; Department of Telecommunications, University of Zagreb, Croatia; Oct. 28, 2005; pp. 1-18.

* cited by examiner

*Primary Examiner* — Commen Jacob
(74) *Attorney, Agent, or Firm* — Wolff & Samson PC

(57) ABSTRACT

A method for routing and wavelength assignment (RWA) in an optical network with improved heuristics for reducing the computational times required for the RWA. The method minimizes the number of wavelengths by packing the lightpaths using a minimum number of bins in a bin packing problem. Computational efficiency is enhanced by using several novel methods to determine shortest paths and eliminate arcs in a graph that represents the network topology.

20 Claims, 21 Drawing Sheets

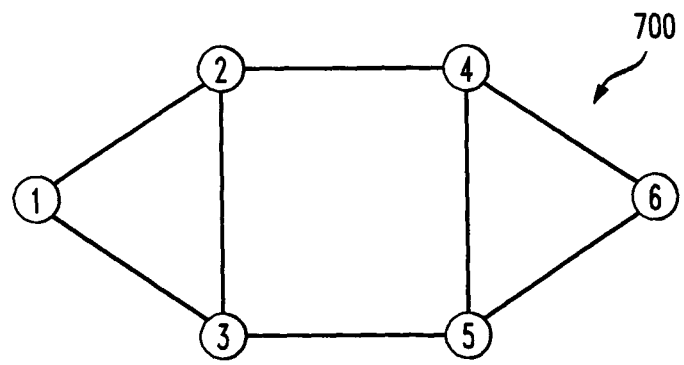
GRAPH OF SHORTEST PATHS FROM ① IS
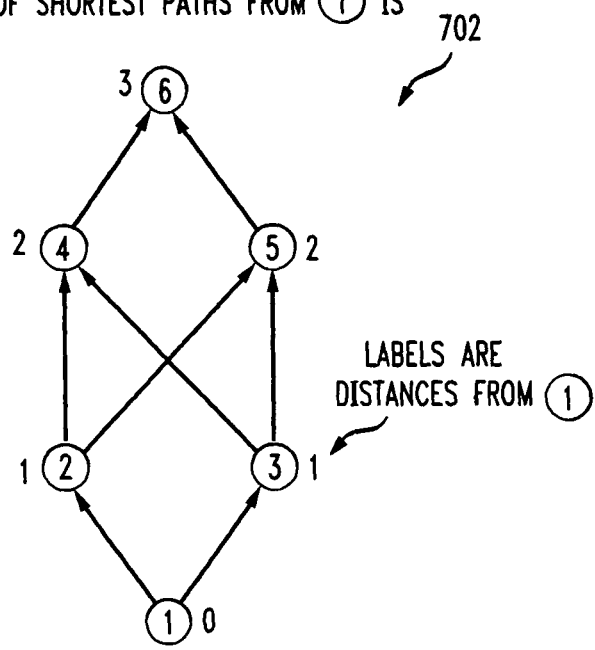
LABELS ARE DISTANCES FROM ①
REMOVE LINK (2,4)
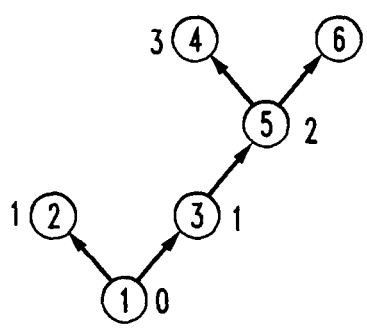
*FIG. 7*

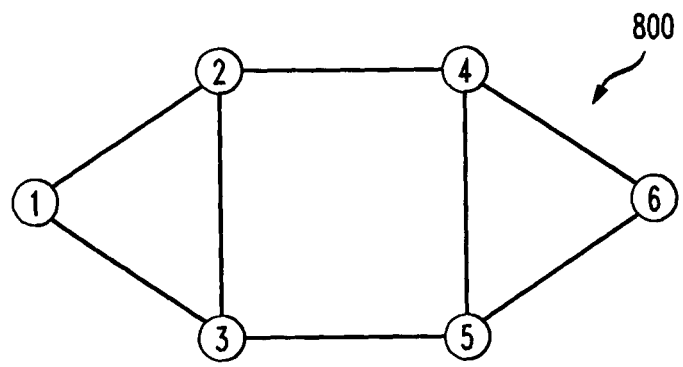
TREE OF SHORTEST PATHS FROM ① IS
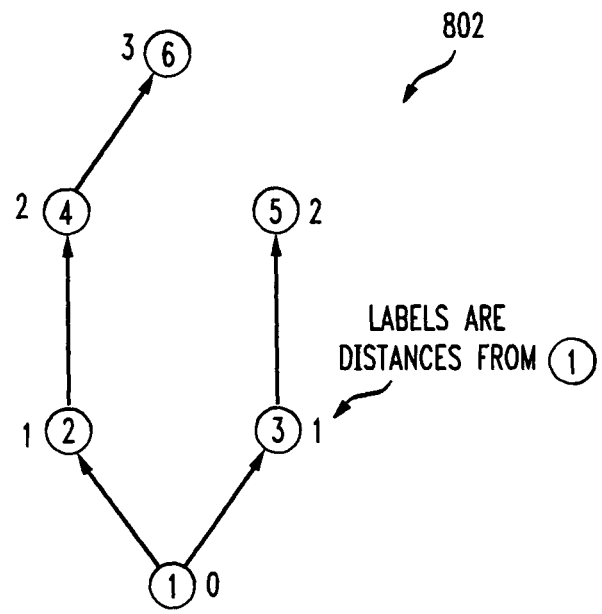
LABELS ARE DISTANCES FROM ①
REMOVE LINK (2,4)
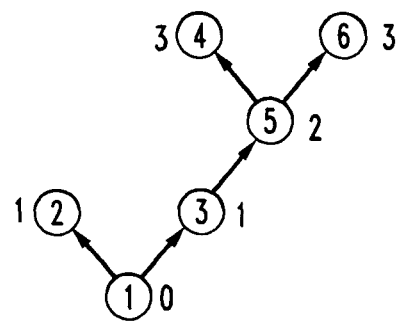
*FIG. 8*

| INSTANCE | NODES | LINKS | LIGHTPATHS | MAXIMUM |
|---|---|---|---|---|
| FINLAND | 31 | 51 | 930 | 1 |
| EON | 20 | 39 | 374 | 2 |
| ATT | 90 | 137 | 359 | 5 |
| ATT2 | 71 | 175 | 4456 | 34 |
| NSF.1 | 14 | 21 | 284 | 3 |
| NSF.3 | 14 | 21 | 258 | 3 |
| NSF.12 | 14 | 21 | 551 | 6 |
| NSF.48 | 14 | 21 | 547 | 6 |
| NSF.2.1 | 14 | 22 | 284 | 3 |
| NSF2.3 | 14 | 22 | 258 | 3 |
| NSF2.12 | 14 | 22 | 551 | 6 |
| NSF2.48 | 14 | 22 | 547 | 6 |

FIG. 19
| SET | FF-RWA GAP | FF-RWA T(s) | FFD-RWA GAP | FFD-RWA T(s) | BF-RWA GAP | BF-RWA T(s) | BFD-RWA GAP | BFD-RWA T(s) |
|---|---|---|---|---|---|---|---|---|
| X | 4.7% | 0.60 | 1.9% | 0.71 | 3.0% | 1.33 | 1.2% | 2.10 |
| Y | 23.1% | 0.52 | 17.0% | 0.58 | 13.9% | 0.76 | 8.4% | 1.07 |
| Z | 13.3% | 0.89 | 9.7% | 1.12 | 10.8% | 1.10 | 7.0% | 1.41 |
| W | 7.3% | 0.10 | 6.3% | 0.10 | 7.5% | 0.11 | 7.1% | 0.12 |
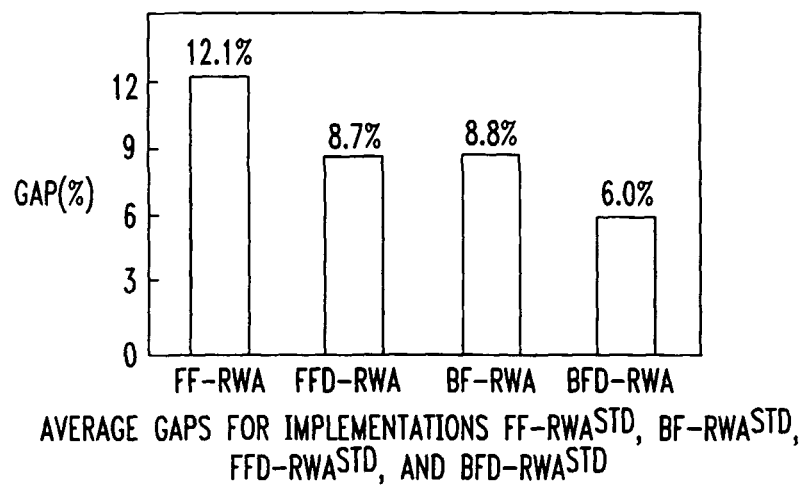
FIG. 20a
AVERAGE GAPS FOR IMPLEMENTATIONS FF-RWA$^{STD}$, BF-RWA$^{STD}$, FFD-RWA$^{STD}$, AND BFD-RWA$^{STD}$
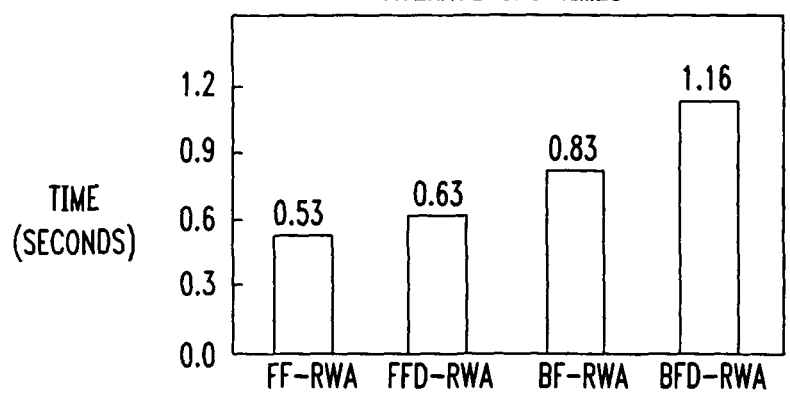
FIG. 20b
CPU TIMES FOR IMPLEMENTATIONS FF-RWA$^{STD}$, BF-RWA$^{STD}$, FFD-RWA$^{STD}$, AND BFD-RWA$^{STD}$

FIG. 21

| HEURISTIC | SET | NRRt(%) | NRRg(%) | RRt(%) | RRg(%) |
|---|---|---|---|---|---|
| FF-RWA | X | 88.3 | 115.6 | 671.8 | 817.4 |
|  | Y | 83.9 | 107.6 | 699.9 | 824.9 |
|  | Z | 73.4 | 95.8 | 745.7 | 884.4 |
|  | W | 98.4 | 119.0 | 423.8 | 497.6 |
| FFD-RWA | X | 84.8 | 112.4 | 562.2 | 690.1 |
|  | Y | 81.1 | 102.9 | 626.0 | 739.1 |
|  | Z | 62.0 | 79.7 | 595.2 | 699.1 |
|  | W | 93.4 | 111.8 | 406.6 | 471.3 |
| BF-RWA | X | 50.3 | 67.5 | 254.2 | 333.2 |
|  | Y | 67.8 | 88.1 | 400.7 | 496.2 |
|  | Z | 63.4 | 83.4 | 568.1 | 685.7 |
|  | W | 91.8 | 114.4 | 363.7 | 431.5 |
| BFD-RWA | X | 37.1 | 50.0 | 163.8 | 209.2 |
|  | Y | 52.8 | 70.4 | 277.3 | 349.0 |
|  | Z | 53.2 | 67.9 | 440.4 | 528.8 |
|  | W | 88.7 | 107.5 | 344.0 | 407.5 |

US 8,693,871 B2

SYSTEM FOR ROUTING AND WAVELENGTH ASSIGNMENT IN WAVELENGTH DIVISION MULTIPLEXING OPTICAL NETWORKS

FIELD OF THE INVENTION

The present invention relates generally to computer networking, and more particularly, to systems and methods for improved routing and wavelength assignment in wavelength division multiplexing (WDM) optical networks.

BACKGROUND OF THE INVENTION

Information in optical networks is transmitted through optical fibers as optical signals. Each link may operate at a speed of the order of terabits per second, which is much faster than the currently available electronic devices for signal reception and transmission. Wavelength Division Multiplexing (WDM) technology allows more efficient use of the huge capacity of optical fibers by permitting the simultaneous transmission of different channels along the same fiber, with each channel using a different wavelength.

An all-optical point-to-point connection between two nodes is called a lightpath. It is characterized by its route and the wavelength in which it is multiplexed. Two lightpaths may use the same wavelength, provided they do not share any common fiber. Such networks require a large number of available wavelengths, especially when wavelength conversion is not available.

Given an optical network and a set of lightpath requests, the problem of Routing and Wavelength Assignment (RWA) in WDM optical networks consists in routing the set of lightpaths and assigning a wavelength to each of them, such that lightpaths whose routes share a common fiber are assigned to different wavelengths. Variants of RWA are characterized by different optimization criteria and traffic patterns, as discussed in papers by J. S. Choi, N. Golmie, F. Lapeyrere, F. Mouveaux, and D. Su, A functional classification of routing and wavelength assignment schemes in DWDM networks: Static case, *Proceedings of the 7th International Conference on Optical Communication and Networks*, pages 1109-1115, Paris, 2000, and H. Zang, J. P. Jue, and B. Mukherjee, A review of routing and wavelength assignment approaches for wavelength-routed optical WDM networks, *Optical Networks Magazine*, 1:47-60, 2000.

In what is commonly referred to as "min-RWA," all lightpath requests are known beforehand. No wavelength conversion is available, i.e. a lightpath must be assigned the same wavelength on all fibers in its route. The objective is to minimize the total number of wavelengths used in the network. This is also known to those skilled in the art as the Path Coloring Problem.

The current state-of-art heuristics for min-RWA were developed by Skorin-Kapov. See N. Skorin-Kapov, Routing and Wavelength Assignment in Optical Networks Using Bin Packing Based Algorithms, *European Journal of Operational Research*, 177: 1167-1179, 2007. Each wavelength is represented by a different copy of a bidirected graph G=(V, A) that represents the physical topology of an optical network. Vertices in V and arcs in A represent network nodes and fibers, respectively. Lightpaths arc-disjointly routed in the same copy of G are assigned the same wavelength. The copies of G are associated with the bins, and the lightpaths with the items of a bin packing problem. See, A. C. F. Alvim, C. C. Ribeiro, F. Glover, and D. J. Aloise, A hybrid improvement heuristic for the one-dimensional bin packing problem, *Journal of Heuristics*, 10:205-229, 2004. The min-RWA determination is reformulated as that of packing the lightpaths using a minimum number of bins.

The size of a lightpath is defined as the hop-count shortest path between its endnodes in G. Lightpaths are not necessarily routed on shortest paths of the original network. This is because whenever a lightpath is placed in a bin (i.e., a copy of G), all arcs in its route are deleted from the corresponding copy of G to avoid that other lightpaths use them. Therefore, the next lightpaths packed in that bin might not be able to be routed on a shortest path.

Four min-RWA heuristics have been developed based on classical bin packing heuristics: (i) FF-RWA, based on the First Fit heuristic, (ii) BF-RWA, based on the Best Fit heuristic, (iii) FFD-RWA, based on the First Fit Decreasing heuristic, and (iv) BFD-RWA, based on the Best Fit Decreasing heuristic.

The following is pseudo-code of bin packing heuristics for FF-RWA, BF-RWA, FFD-RWA, and BFD-RWA, all of which are quite similar:

```
begin heuristic(G, τ, d)
1.    Let t be a permutation of the lightpaths in τ;
2.    Set Ω ← ∅ and S ← ∅;
3.    for i = 1,...,|t| do
4.        Find the bin ω ∈ Ω where the shortest path of t_i in ω has less
than d arcs;
5.        if no such a bin exists then do
7.            ω ← new copy of G;
8.            Ω ← Ω 520 {ω};
9.        end if
10.       Let p_i be the shortest path between the endnodes of t_i in ω;
11.       S ← S 520 (p_i,ω);
12. Delete edges in path p_1 from ω;
13. end-for;
14. return S;
end
```

The inputs are the graph G, the set τ of lightpath requests, and the value d of the maximum number of links in each route. As suggested by Skorin-Kapov, d is set to be the maximum of the square root of the number of links in the network and the diameter of G (i.e., the maximum value of a shortest path between any two nodes in the network). The output is a set S of tuples $(p_i, \omega_i)$, for i=1, ..., |τ|, where $p_i$ is the route followed by lightpath $t_i$ and $\omega_i$ is the wavelength with which it is multiplexed. With reference to the above pseudo-code, a permutation t of lightpaths in τ is built in line 1. In FF-RWA and BF-RWA, lightpaths are randomly distributed in t, while in FFD-RWA and BFD-RWA, they are sorted in non-increasing order of their sizes. In line 2, the set S and the set Ω of copies of G are initialized. The lightpaths are routed and assigned a wavelength in lines 3 to 13, one at a time, according to their order in t. A bin ω∈Ω in which lightpath $t_i$ can be routed with less than d arcs is sought in line 4. FF-RWA and FFD-RWA stop at the first bin found, while BF-RWA and BFD-RWA scan all bins in Ω and select that in which $t_i$ fits with the smallest number of arcs (since the arcs in each copy of G are not necessarily the same). Let $p_i$ be the shortest path between the endnodes of $t_i$ in ω. If there is no bin in Ω where $p_i$ fits with less than d arcs, then $t_i$ is routed on a new copy of G that is created in line 7 and added to set Ω in line 8. The tuple $(p_i, \omega)$ is added to the solution in line 11, and all arcs in $p_i$ are deleted from ω in line 12 to avoid that other lightpaths are routed on those arcs in this copy of G.

FIG. 1 is a flow-diagram of the process described above. In step 100, the procedure starts. At step 102, the following are input: graph G=[V, E], τ and d. Vertices V and edges E represent nodes and fibers, respectively, and d represents the diameter, i.e., the longest path between any two nodes in G. At step 104, no bins are open yet so the following are intialized: t←permutation of τ, bins Ω←∅ (empty set), Solution S←∅ (empty set). If i>|t| at 106, then the solution S is returned at block 108 and the procedure terminates at block 110. If the answer at step 106 is negative, then step 112 calculates the bin ω in Ω where the shortest path of $t_i$ can be routed with less than d arcs. If no such bin ω exists at step 114, then step 116 assigns a new copy of G to a bin ω and updates Ω. At step 118, the shortest path $p_i$ is computed between endpoints of $t_i$ in bin ω and the solution is updated S←S∪{$p_i,ω_i$}. At step 120, all arcs (edges) in $p_i$ are deleted from ω. Step 122 then increments i and the procedure loops back to step 106.

FIG. 2a depicts an exemplary 6-node network that forms an initial graph G. For this graph, τ={(1,6),(2,5),(3,4),(2,6)}, d=max{$\sqrt{|E|}$, diameter(G)}, where |E|=8→$\sqrt{8}$=2$\sqrt{2}$. Accordingly, the diameter of G=5, which is the longest path between any of the two links, i.e., G=|{1→2→3→5→4→6}|=5. Let t={1,2,3,4} be a permutation of $P_1, P_2, P_3, P_4$, therefore pairs are routed in this order: $P_1, P_2, P_3, P_4$. In accordance with the above, step 104 in FIG. 1 sets Ω=∅ (start with no bins) and S=∅ (start with no solution). For i=1, $P_i$=(1,6), a bin $ω_1$ is created with graph G of FIG. 2a. The shortest path (1,6)=1→2→4→6 of size 3 (step 118, FIG. 1). Wavelength $ω_1$ is then assigned to $P_1$→S={($P_1,ω_1$)}, and $P_1$ is removed from bin $ω_1$. This results in the updated graph G of FIG. 2b. For i=2, $P_2$=(2,5) and the shortest path (2,5) in $ω_1$=2→3→5 of size 2. Wavelength $ω_1$ is then assigned to $P_2$→S={($P_1,ω_1$), ($P_2,ω_1$)}, and $P_2$ is removed from $ω_1$. The updated graph G is shown in FIG. 2c. For i=3, $P_2$=(3,4) there is no path of length d or less in $ω_1$, thus to go between nodes 3 and 4, a new bin has to be created $ω_2$ (FIG. 2d). The shortest path (3,4) in $ω_2$=3→2→4 of size 2. Wavelength $ω_2$ is assigned to $P_3$ and added to the solution $P_3$→S={($P_1,ω_1$), ($P_2,ω_1$), ($P_3,ω_2$)}. The links in path $P_3$ are then removed from $ω_2$ and the updated graph appears in FIG. 2e. For i=4, $P_4$=(2,6), the shortest path in $ω_2$ is $ω_2$=2→1→3→5→6 of size 4. Wavelength $ω_2$ is assigned to $P_4$ and added to the solution $P_4$→S={($P_1,ω_1$),($P_2,ω_1$),($P_3,ω_2$),($P_4,ω_2$)}. For i>4 the process stops (step 106, FIG. 1) and the solution S for this case uses 2 wavelengths (min-RWA).

While the above-described example is very simple, the running times reported by Skorin-Kapov for typical networking min-RWA determinations using these heuristics were very high. On the largest instances, running times of up to 8 minutes on a Pentium IV 2.8 GHz have reported. Let n=|V|, m=|A|, and l=|τ|. Furthermore, let $c^{sp}$ (m,n) be the computational complexity of a one-to-all shortest path algorithm applied to G, and $C^{del}$ (m,n) be the complexity of deleting an arc from G. The worst case complexity T(n,m,l) of FF-RWA, BF-RWA, FFD-RWA, and BFD-RWA is calculated as follows. For the sake of simplicity, it will be assumed that n<l, which holds for all real and artificial networks in the literature. With reference to the above pseudo-code, first, all-to-all shortest paths are calculated in time O(n·$c^{sp}$ (m,n)) in line 1, and sets Ω and S are initialized in constant time in line 2. Next, lines 3 to 13 are repeated for each lightpath $t_i$, with i=1, . . . , l. In line 4, a bin where $t_i$ fits with less than d arcs is found in time O(l·$c^{sp}$ (m,n)). A new copy of G is created in time O(m) in line 7 and added to set Ω in constant time in line 8. Finally, the set S is updated in constant time in line 11, while the arcs in $p_i$ are deleted from ω in time O(d·$c^{del}$) in line 12. Therefore, the worst case complexity of these heuristics is:

$$T(n, m, l) = O(n \cdot c^{sp}(m, n)) + O(1) +$$
$$O(l \cdot (l \cdot c^{sp}(m, n) + m + 1 + d \cdot c^{del}(m, n)))$$
$$= O(n \cdot c^{sp}(m, n) + l^2 \cdot c^{sp}(m, n) + l \cdot m + l \cdot d \cdot c^{del}(m, n)).$$

The efficiency of the heuristics therefore depends on how fast a shortest path (SP) query is performed and how fast an arc is removed from G. The traditional implementations using Dijkstra's algorithm and single linked lists to represent the adjacency matrix of G lead to $c^{sp}$(m,n)=O(n·log n+m) and $c^{del}$(m,n)=O(n). Therefore, T(n,m,l)=O(n·(n·log n+m)+$l^2$·(n·log n+m)+l·m+l·d·n)=O($l^2$·(n·log n+m)).

The inventors have discovered that it is possible to greatly improve the processing time of known min-RWA heuristics through the use of novel SP queries and arc removal.

SUMMARY OF THE INVENTION

In accordance with a first aspect of the present invention, there is disclosed a method for routing and wavelength assignment in an optical network where each wavelength is represented as a copy of a bidirected graph G that represents a physical topology of the network, where lightpaths arc-disjointly routed in a same copy of G are assigned a same wavelength and copies of G are associated with bins of a bin-packing problem. The method minimizes the number of wavelengths by packing the lightpaths using a minimum number of bins and comprises: implementing a breadth first search to determine hop-count shortest paths between nodes in the network in constant time O(m), where m is the number of links in the network; and removing arcs between nodes from G in constant time O(1).

In accordance with the invention, the graph G is represented by an adjacency list M for each node in G and for each node in the network a doubly-linked list is maintained having cells corresponding to arcs having each node as an origin, and an array P pointing to an address of each cell in M is used to obtain the address of its corresponding cell in constant time.

The bin-packing problem is solved with a first-fit (FF), first-fit-decreasing (FFD), best-fit (BF) or best-fit-decreasing (BFD) method.

In accordance with another aspect of the present invention, there is disclosed a method for routing and wavelength assignment in an optical network where each wavelength is represented as a copy of a graph G of shortest paths that represents a physical topology of the network, where lightpaths arc-disjointly routed in a same copy of G are assigned a same wavelength and copies of G are associated with bins of a bin-packing problem. The method minimizes the number of wavelengths by packing the lightpaths using a minimum number of bins and comprises: probing the shortest path graph G to determine hop-count shortest paths between nodes in the network in constant time O(m), where m is the number of links in the network; and removing arcs between nodes from G in constant time O(1) by increasing a weight of each arc to be removed to ∞.

In accordance with this aspect of the invention, G is represented by a n×n distance matrix in which each entry is the value of the shortest path between two corresponding nodes in G; and G is updated by a Ramalingam and Reps method.

A modification of the above represents G by a n×n distance matrix in which each entry is the value of the shortest path between two corresponding nodes in G and the distance matrix gives a lower bound of a shortest path between any two nodes in G in time O(1). If the lower bound is greater than a diameter d in G, then the method opens a new bin with a shortest path graph G; and if the lower bound is less than or equal to d, then updating G by the Ramalingam and Reps method.

Here again, the bin-packing problem is solved with a first-fit (FF), first-fit-decreasing (FFD), best-fit (BF) or best-fit-decreasing (BFD) method.

In accordance with another aspect of the invention there is disclosed a method for routing and wavelength assignment in an optical network where each wavelength is represented as a copy of a tree G that represents a physical topology of the network, where lightpaths arc-disjointly routed in a same copy of G are assigned a same wavelength and copies of G are associated with bins of a bin-packing problem. The method minimizes the number of wavelengths by packing the lightpaths using a minimum number of bins, comprising: probing the shortest path tree G to determine hop-count shortest paths between nodes in the network in time O(m), where m is the number of links in the network; and removing arcs between nodes from G in constant time O(1) by increasing a weight of each arc to be removed to ∞.

As described above with respect to graphs, in accordance with this aspect of the invention, the tree G is represented by a n×n distance matrix in which each entry is the value of the shortest path between two corresponding nodes in G; and G is updated by a Ramalingam and Reps method.

A modification of the above represents the tree G by a n×n distance matrix in which each entry is the value of the shortest path between two corresponding nodes in G and the distance matrix gives a lower bound of a shortest path between any two nodes in G in time O(1). If the lower bound is greater than a diameter d in G, then the method opens a new bin with a shortest path graph G; and if the lower bound is less than or equal to d, then updating G by the Ramalingam and Reps method.

Here again, the bin-packing problem is solved with a first-fit (FF), first-fit-decreasing (FFD), best-fit (BF) or best-fit-decreasing (BFD) method.

These aspects of the invention and further advantages thereof will become apparent to those skilled in the art as the present invention is described with particular reference to the accompanying drawings.

BRIEF DESCRIPTION OF THE DRAWINGS

FIG. 7 is a schematic depiction of RRg updating of a sample 6-node network, a shortest path graph and a link removal; in accordance with aspects of the present invention;

FIG. 8 is a schematic depiction of RRt updating of a sample 6-node network, a shortest path tree and link removal, in accordance with aspects of the present invention;

FIG. 19 shows a table for sets X, Y, Z, and W in accordance with an aspect of the present invention;

FIG. 20a depicts average solution gaps and FIG. 20b shows CPU times for implementations in accordance with aspects of the present invention;

FIG. 21 shows the average CPU times for implementations as a percent deviation of the times using STD, in accordance with aspects of the present invention.

DETAILED DESCRIPTION OF THE INVENTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items.

In accordance with a first aspect of the invention, the hop-count shortest paths (SP) can be calculated using a Breadth First Search (BFS) in time O(m). As will be understood by those skilled in the art, a BFS is an uninformed search method that aims to expand and examine all nodes of a graph or combinations of sequence by systematically searching through every solution.

Figure 3:
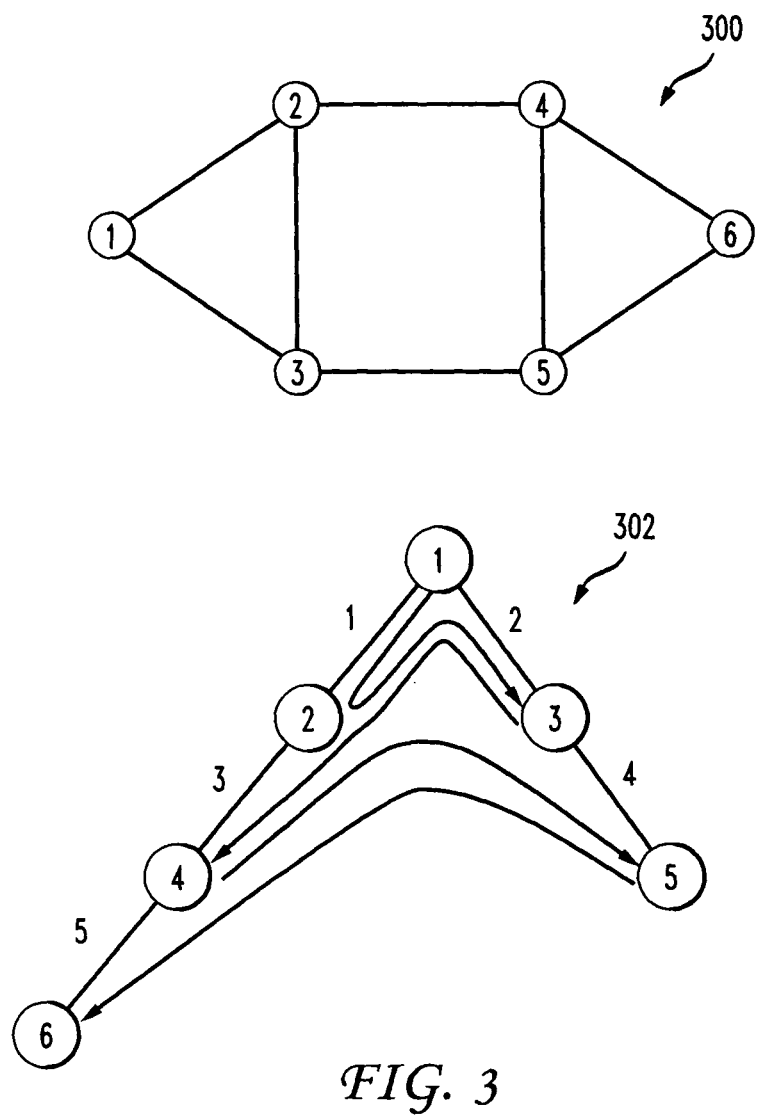
FIG. 3 is a schematic of an exemplary 6-node network and a Breadth First Search (BFS) to find a Shortest Path (SP) between nodes 1 and 6 (1, 6) in accordance with aspects of the present invention.
Figure 4:
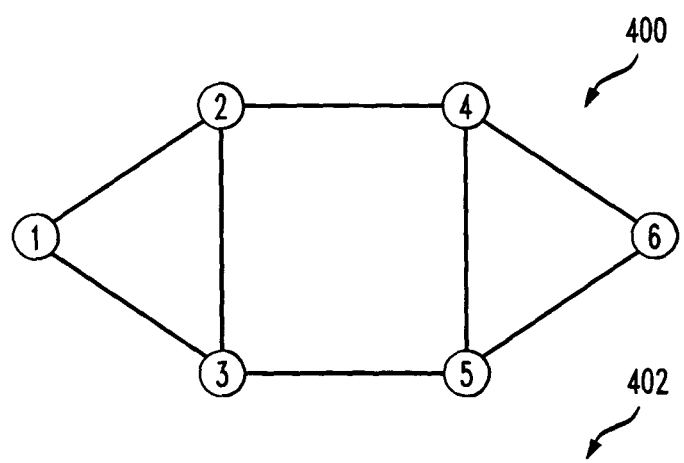
FIG. 4 is a representation of a 6-node network and an adjacency matrix of the nodes of the same network in accordance with aspects of the present invention.
Figure 5:
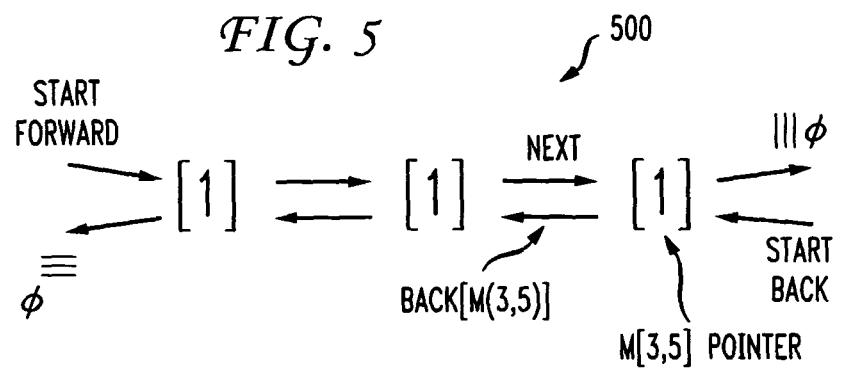
FIG. 5 is a depiction of path (3,5) in a doubly linked list in accordance with aspects of the present invention.
Figure 6A:
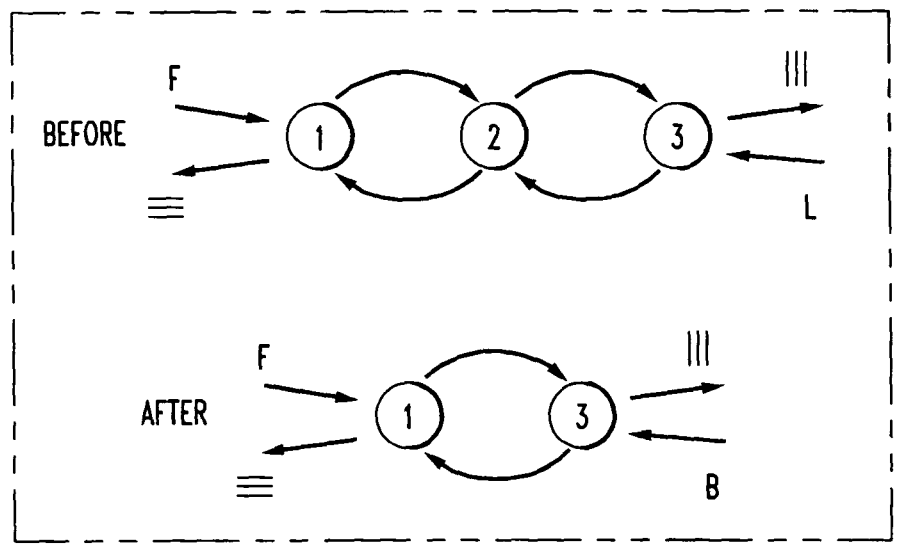
FIGS. 6a, 6b and 6c show cases of removing an element from a doubly-linked list, removing element first in the list, removing element last in the list and removing element neither first nor last in the list, respectively, in accordance with aspects of the present invention.
Figure 6B:
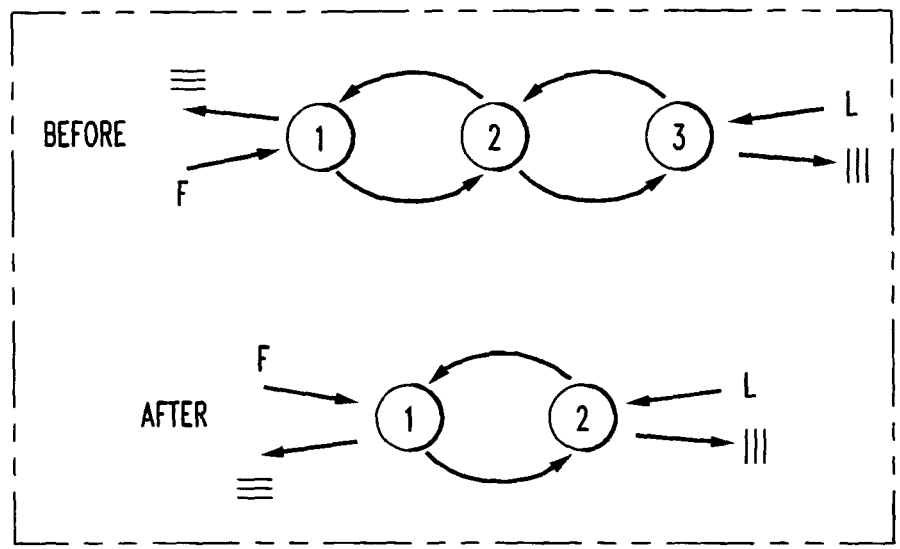
Figure 6C:
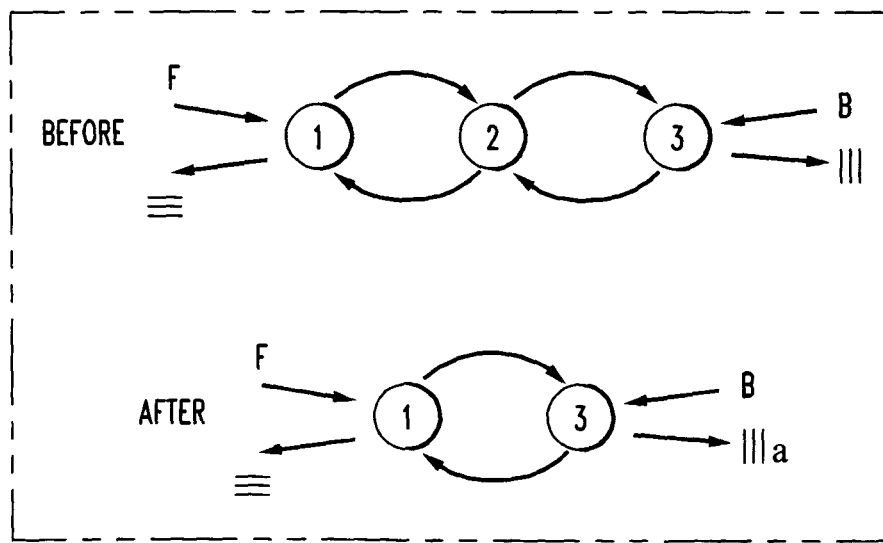

FIG. 3 is a schematic of an exemplary 6-node network 300 and a BFS 302 to find a SP between nodes 1 and 6 (1, 6). Starting at node 1, all nodes are scanned in the order indicated by number or links until node 6 is scanned. Thus, the SP for (1,6)=1→2→4→6. Any arc can be deleted in time O(1) using the representation of G by adjacency lists M as follows. For each node i ∈V, a doubly linked list is kept whose cells correspond to the arcs having i as their origin. Furthermore, an array P pointing to the address of each cell in M is kept. Whenever an arc (i,j) is to be removed, P is used to obtain the address of its corresponding cell in constant time. Since the adjacency list of node i is doubly linked, the cell corresponding to arc (i,j) can be deleted in time O(1). FIG. 4 is a representation of the same 6-node network 400 and an adjacency matrix 402 of the nodes in network 400. To remove arc (i,j) in adjacency matrix 402, set $M_{i,j}=0$. For example, to remove (3,5) and (5,3), M(3,5) which is 1 must become 0 and M(5,3) must become 1. In line 3 of matrix 402, a doubly linked list representation is as follows: [1] [1] [0] [0] [1] [0]. FIG. 5 is a depiction of path (3,5) in a doubly lined list 500. To remove (3,5), the procedure is (1) Start Back←Back (M(3,5)) and (2) Next (Start Back)←Next (M(3,5))=0. To remove any element from a doubly-linked list, there are three cases as shown in FIGS. 6a (element first in the list), 6b (element last in the list) and 6c (element neither first nor last in the list), respectively.

This data structure and the BFS algorithm were used in the standard implementation STD of the four heuristics. Therefore, the complexity of the min-RWA heuristics using STD is:

$$T(n,m,l)=O(n \cdot m+l^2 \cdot m+l \cdot m+l \cdot d)=O(l^2 \cdot m).$$

The most expensive operation of the min-RWA heuristics appears in line 4 of the pseudo-code as shown in the background section, where a SP query is performed in at most l bins for each of the l lightpaths in τ. At this point, only the value of the shortest path is required. Therefore, another implementation based on an n×n distance matrix is proposed in which each entry is the value of the shortest path between the two corresponding nodes in G. With reference to the pseudo-code, it is initialized in O(n·m) in line and instantiated for each new bin created in $O(n^2)$ in line 7. As long as arcs are deleted from a bin, the shortest paths on that bin may change and the corresponding distance matrix must be updated.

The new data structure allows SP queries to be performed in constant time. However, the efficiency of the heuristics depends on how fast the updates are performed. Given the graph G=(V, E) and a node v ∈V, the shortest path graph of v is a subgraph $G^v=(V, E^v)$ of G, with $E^v \subseteq E$, such that the path from any vertex i to v in $G^v$ corresponds to the shortest path from i to v in G. If the graph is acyclic, it is called a shortest path tree. Experiments were conducted utilizing four algorithms for updating the distance matrix. The first two are based on the work presented by G. Ramalingam and T.W. Reps, An incremental algorithm for a generalization of the shortest-path problem, *Journal of Algorithms*, 21:267-305, 1996, for dynamically updating SP graphs and SP trees, respectively, (hereinafter "RRg" and "RRt") while the last two are adaptations of the former two algorithms (hereinafter "NRRg" and "NRRt").

Given a node v ∈V and the SP graph $G^v$, the RRg algorithm as presented by G. Ramalingam and T.W. Reps for dynamically updating SP graphs is based on the observation that when the weight of an arc a ∈E increases, the shortest paths from v to many vertices in V might not change and do not need to be recalculated. Arcs are deleted by increasing their weights to infinity. If a ∉$E^v$, no update is necessary; otherwise a is removed from $G^v$. Next, if $G^v$ remains connected, the algorithm stops. Otherwise, the set U of vertices whose shortest paths to v have changed is identified and removed from $G^v$. Then, each vertex u ∈U is inserted into a priority queue Q with a key equal to the weight of the least cost arc from u to one of the vertices that remained in $G^v$. Finally, the algorithm proceeds in a Dijkstra-like fashion.

In accordance with an aspect of the invention, algorithm RRg keeps one SP graph for each vertex in V. With reference to the pseudo-code of FIG. 1, the SP graphs are initialized in O(n·m) in line 1 and instantiated for each new bin created in O(n·m) in line 7. After each arc in $p_i$ is deleted from o in line 12, RRg checks if any SP graph of ω must be updated. If so, the RRg algorithm for SP graphs is applied, and the distance matrix is updated. In the worst case scenario, n SP graphs are updated in O(n·m). Therefore, the complexity of the min-RWA heuristics using RRg is:

$$T(n,m,l)=O(n \cdot m+l^2+l \cdot n \cdot m+l \cdot d \cdot (n \cdot m))=O(l^2+l \cdot d \cdot n \cdot m).$$

Figure 1:
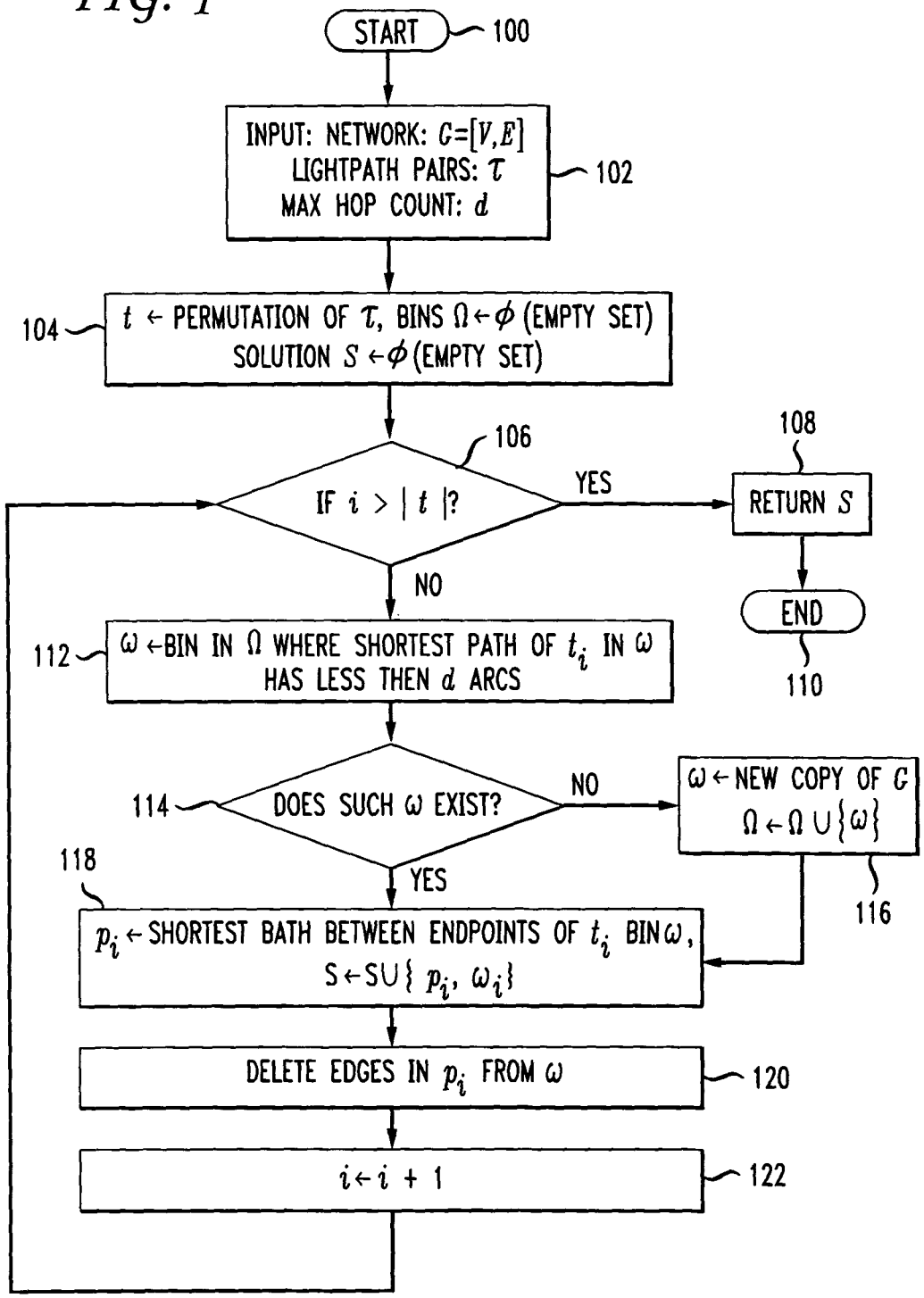
FIG. 1 is a flow diagram of an exemplary routing and wavelength assignment.
Figure 2A:
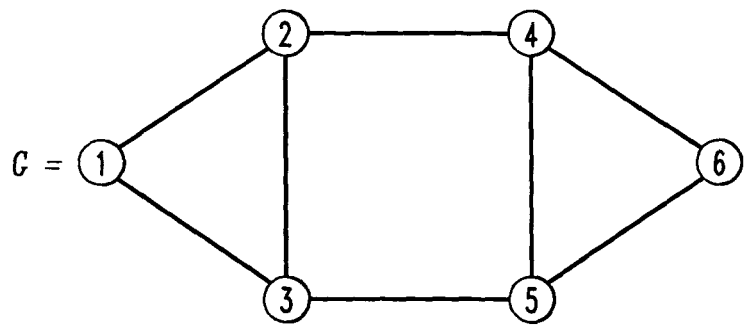
FIGS. 2a, 2b, 2c, 2d and 2e depict an exemplary 6-node network that forms an initial graph G and the development of the routing and wavelength assignment.
Figure 2B:
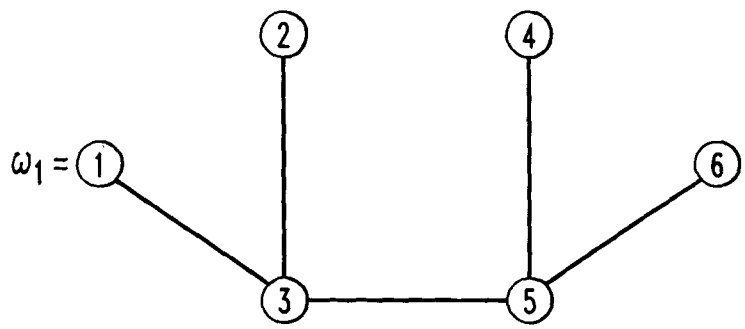
Figure 2C:
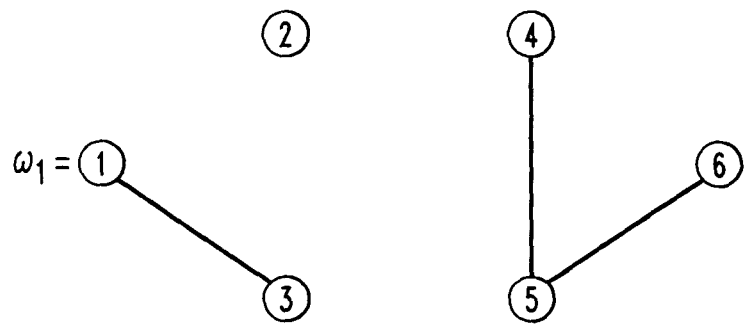
Figure 2D:
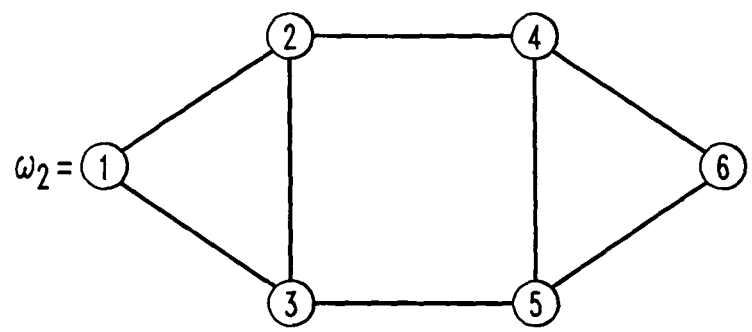
Figure 2E:
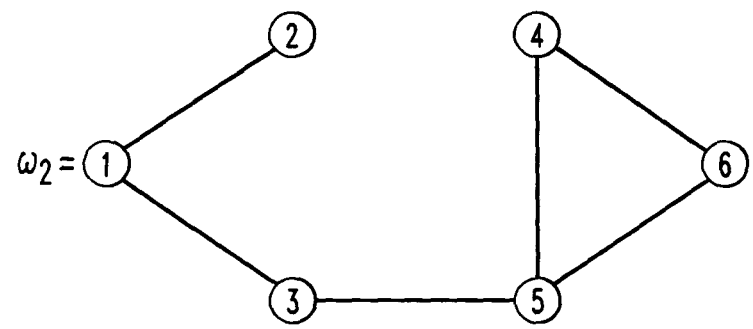

FIG. 7 is a schematic depiction of RRg updating of a sample 6-node network 700 for the shortest path graphs 702 (step 112, FIG. 1) and link removal 704 (step 120, FIG. 1).

A variant of the RRg algorithm is RRt. The methodology is similar that described above, however, the identification of the vertices in U and the shortest path updates are performed more efficiently in SP trees. Every time an arc a ∈$E^v$ is deleted, the data structure has to be updated. Using a Fibonacci heap, as is known by those skilled in the art, to implement Q, the worst case time complexity of both algorithms is O(n·log n+m). However, since only deletions are performed and the arcs have unit cost, it can be implemented in time O(m) by using a bucket to implement Q.

RRt keeps one SP tree for each vertex in V. With reference to the pseudo-code, the SP trees are initialized in O(n·m) in line 1 and instantiated for each new bin created in time $O(n^2)$ in line 7. As before, after each arc deletion, RRt checks if any SP tree of ω must be updated. If so, the algorithm of G. Ramalingam and T.W. Reps for trees of shortest paths is used, and the distance matrix is updated. Therefore, the complexity of the min-RWA heuristics using RRt is $$T(n,m,l)=O(n \cdot m+l^2+l \cdot n^2+l \cdot d \cdot (n \cdot m))=O(l^2+l \cdot d \cdot n \cdot m).$$

FIG. 8 is a schematic depiction of RRt updating of a sample 6-node network 800 for the shortest path trees 802 (step 112, FIG. 1) and link removal 804 (step 120, FIG. 1).

Another embodiment utilizes a modified RRg algorithm referred to herein as "NRRg" (graph) and a modified RRt algorithm referred to herein as "NRRt" (tree), that uses the same data structure as RRg/RRt, but without dynamically updating the SP graph/tree as soon as an arc is deleted. Therefore, the distance matrix gives a lower bound to the shortest path between any two nodes in time O(1), since the shortest paths can only increase after an arc deletion. If the lower bound is larger than d, the correct distance is not needed. Otherwise, it can be calculated in time O(d) by retrieving the shortest path in the SP graph (or SP tree) of the sink node of the lightpath. If no arc along the shortest path has been deleted, the value stored in the distance matrix is exact. Otherwise, algorithm NRRg (or NRRt) updates only the corresponding SP graph (or SP tree) from scratch and the entries of the distance matrix that have changed. Therefore, the worst case complexity of an SP query is O(m). However, no SP graph (or SP tree) update is necessary in line 12 of the pseudo-code and the arc deletion can be done in O(d) for each lightpath. Accordingly, the complexity of the min-RWA heuristics using algorithm NRRg is:

$$T(n,m,l)=O(n \cdot m+l^2 \cdot m+l \cdot n \cdot m+l \cdot d)=O(l^2 \cdot m),$$

while using algorithm NRRt it is:

$$T(n,m,l)=O(n \cdot m+l^2 \cdot m+l \cdot n^2+l \cdot d)=O(l^2 \cdot m).$$

Figure 9:
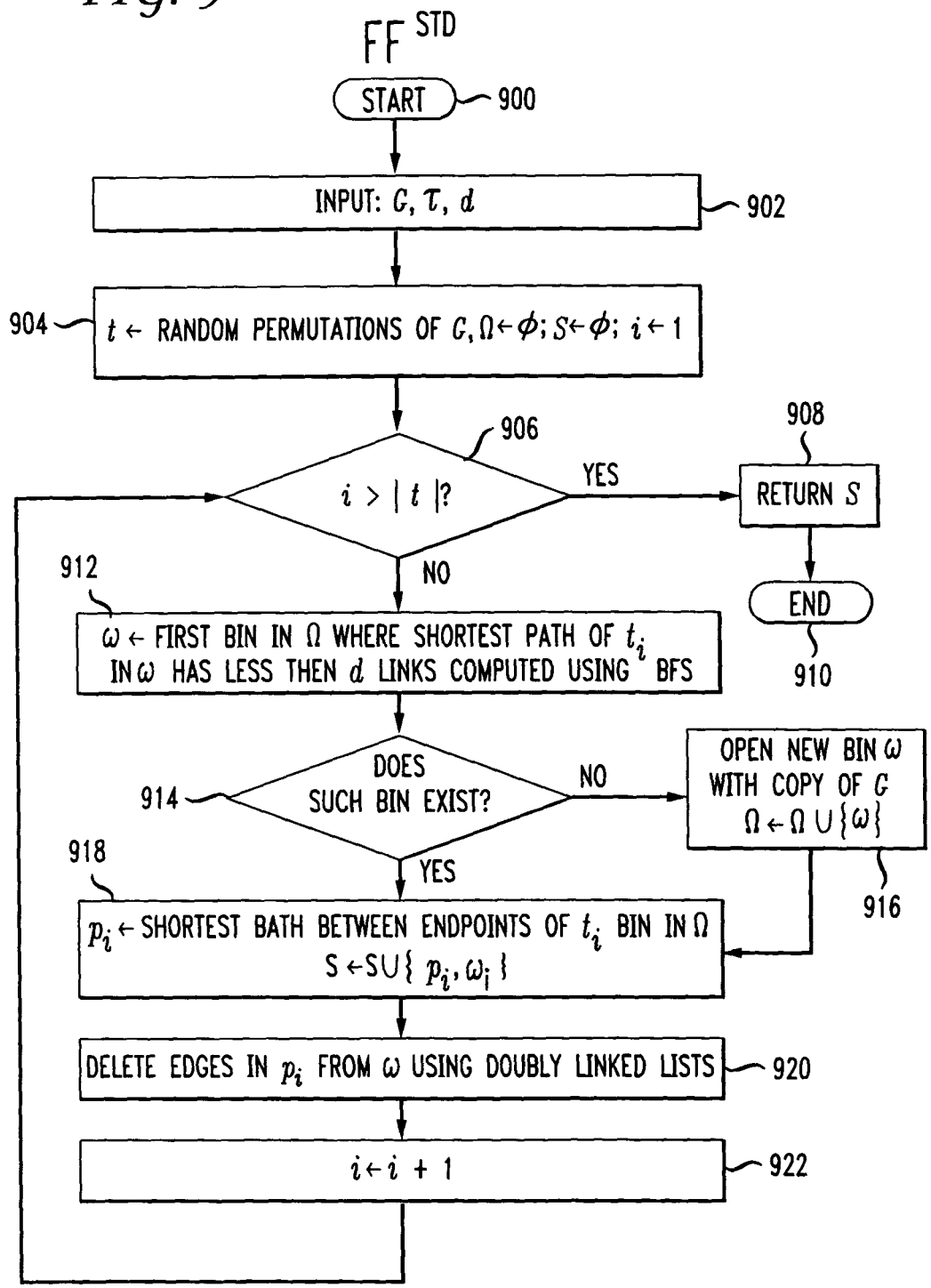
FIG. 9 is a flowchart of a $FF^{STD}$ expedient in accordance with aspects of the present invention.

FIG. 9 is a flowchart of a $FF^{STD}$ expedient (using the methodology shown in FIGS. 3-5). In step 900, the procedure starts. In step 902, the following are input: graph G=[V, E], τ and d. In step 904, no bins are open yet so the following are initialized: t←random permutations of G, Ω←Ø (empty set), Solution S←Ø (empty set) and i←1. If i>|t| at 906, then the solution S is returned at block 908 and the procedure terminates at block 910. If the answer at step 906 is negative, then step 912 calculates the bin ω in Q where the shortest path of $t_i$ can be routed with less than d arcs using a BFS as described above. If no such bin ω exists at step 914, then step 916 assigns a new copy of G to a bin ω and updates Ω. At step 918, the shortest path $p_i$ is computed between endpoints of $t_i$ in bin ω and the solution is updated S←S∪{$p_i,ω_i$}. At step 920, all edges in $p_i$ are deleted from w using doubly-linked lists as described above. Step 922 then increments i and the procedure loops back to step 906.

Figure 10:
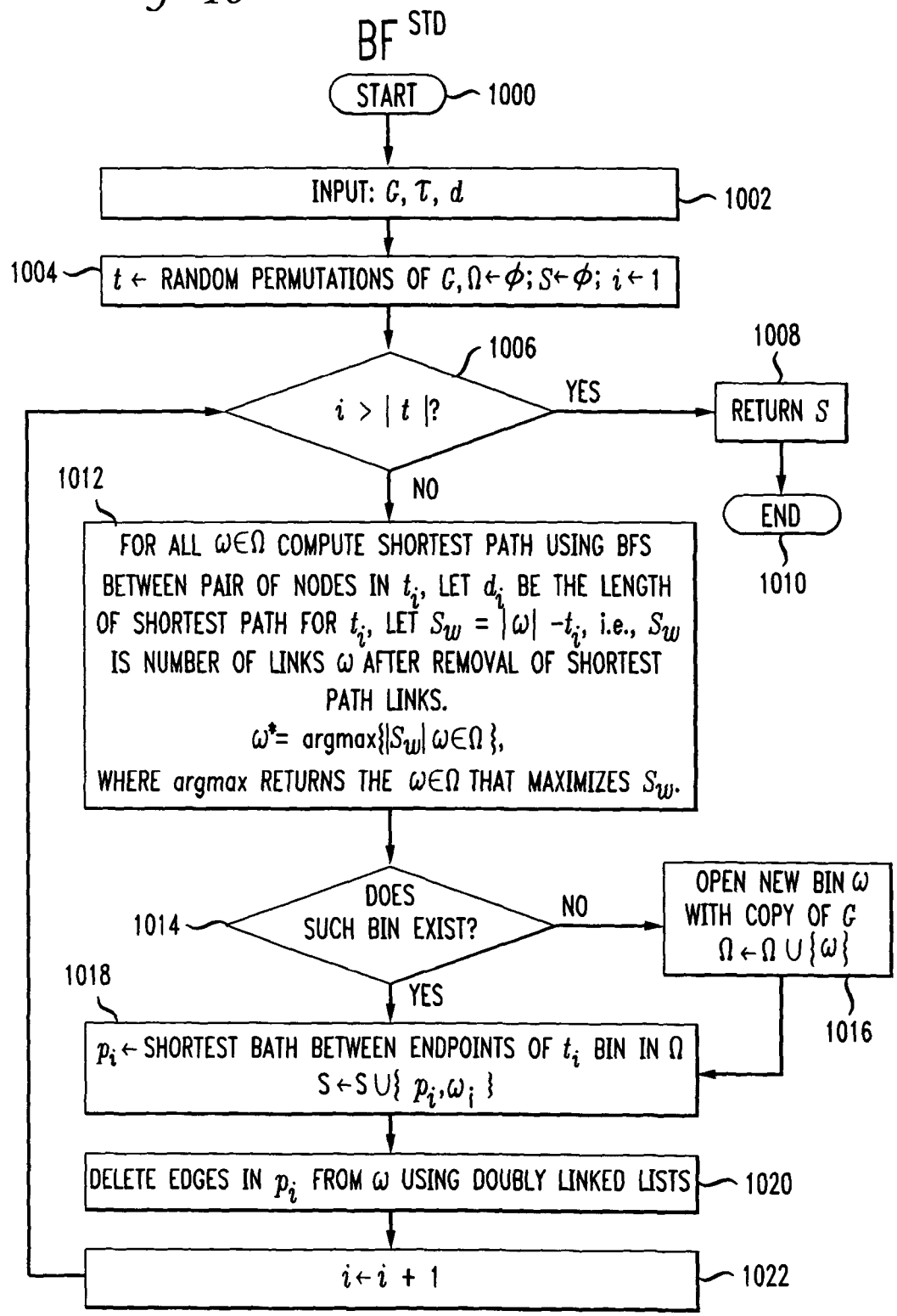
FIG. 10 is a flowchart of a $BF^{STD}$ method in accordance with an aspect of the present invention.

FIG. 10 is a flowchart of a $BF^{STD}$ method in accordance with an aspect of the invention. In step 1000, the procedure starts. In step 1002, the following are input: graph G=[V, E], τ and d. In step 1004, no bins are open yet so the following are initialized: t←random permutations of G, Ω←∅ (empty set), Solution S←∅ (empty set) and i←1. If i>|t| at 1006, then the solution S is returned at block 1008 and the procedure terminates at block 1010. If the answer at step 1006 is negative, then step 1012 calculates for all bins ω in Ω, the shortest path using a BFS between pairs of nodes in $t_i$, where $d_i$ is the length of shortest path for $t_i$. Let $S_w=|ω|-t_i$, i.e., $S_w$ is number of links in ω after removal of shortest path links, and ω*=argmax{$S_w|ω ∈ Ω$}, where argmax returns the ω ∈ Ω that maximizes $S_w$. If no such bin ω exists at step 1014, then step 1016 assigns a new copy of G to a bin ω and updates Ω. At step 1018, the shortest path $p_i$ is computed between endpoints of $t_i$ in bin ω and the solution is updated S←S∪{$p_i,ω_i$}. At step 1020, all edges in $p_i$ are deleted from ω using doubly-linked lists as described above. Step 1022 then increments i and the procedure loops back to step 1006.

Figure 11:
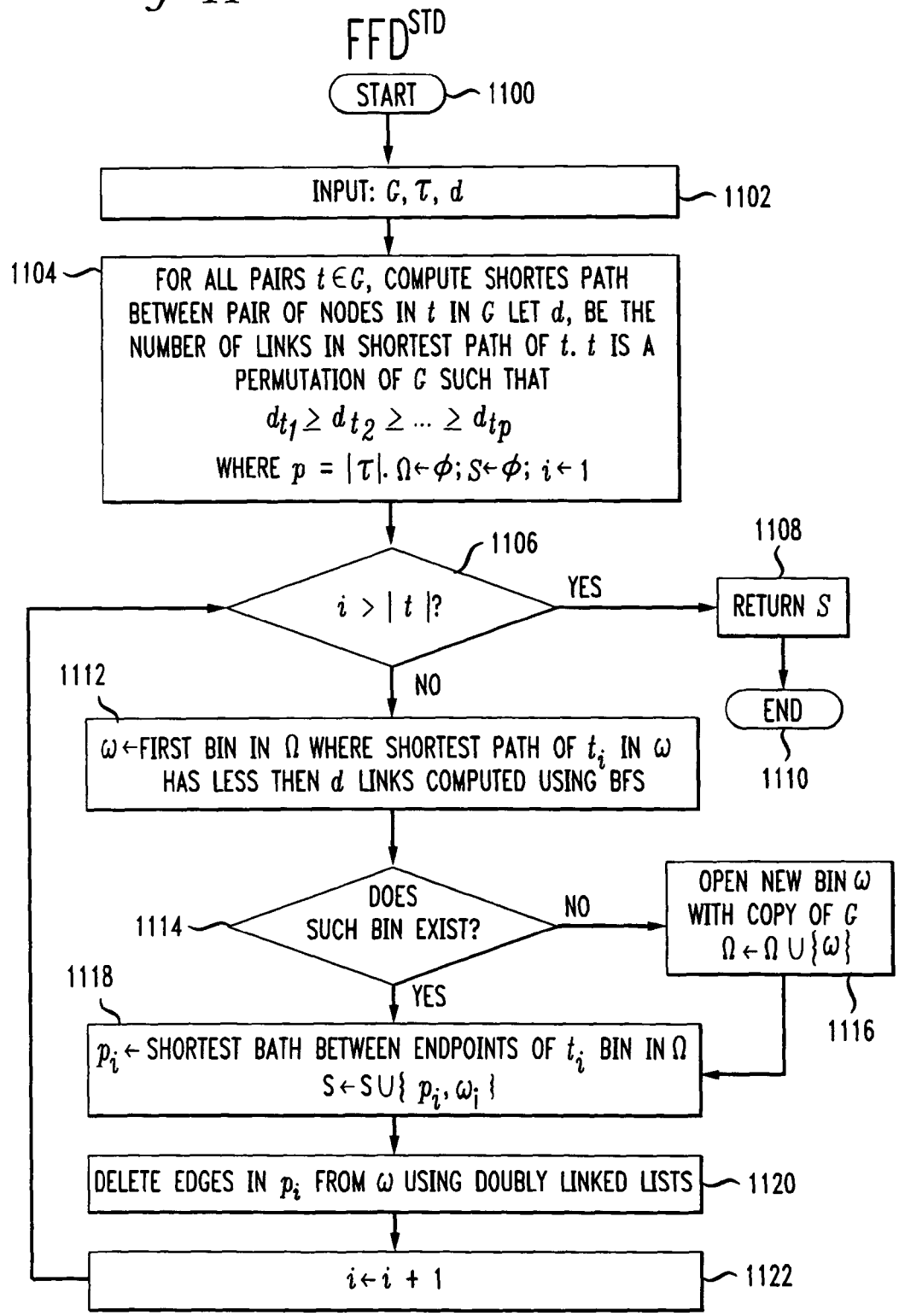
FIG. 11 is a flowchart of a $FFD^{STD}$ method in accordance with an aspect of the present invention.

FIG. 11 is a flowchart of a $FFD^{STD}$ method in accordance with an aspect of the invention. In step 1100, the procedure starts. In step 1102, the following are input: graph G=[V, E], τ and d. In step 1104, for all pairs t ∈ G, compute shortest path between pair of nodes in t in G and let $d_t$ be the number of links in the shortest path of t, where t is a permutation of G such that $d_{t_1} ≥ d_{t_2} ≥ ... ≥ d_{t_p}$ and where p=|τ|, initialize: Ω←∅; S←∅; i←1. If i>|t| at 1106, then the solution S is returned at block 1108 and the procedure terminates at block 1110. If the answer at step 1106 is negative, then step 1112 calculates the bin ω in Ω where the shortest path of $t_i$ can be routed with less than d arcs using a BFS as described above. If no such bin ω exists at step 1114, then step 1116 assigns a new copy of G to a bin ω and updates Ω. At step 1118, the shortest path $p_i$ is computed between endpoints of $t_i$ in bin ω and the solution is updated S←S∪{$p_i,ω_i$}. At step 1120, all edges in $p_i$ are deleted from o using doubly-linked lists as described above. Step 1122 then increments i and the procedure loops back to step 1106.

Figure 12:
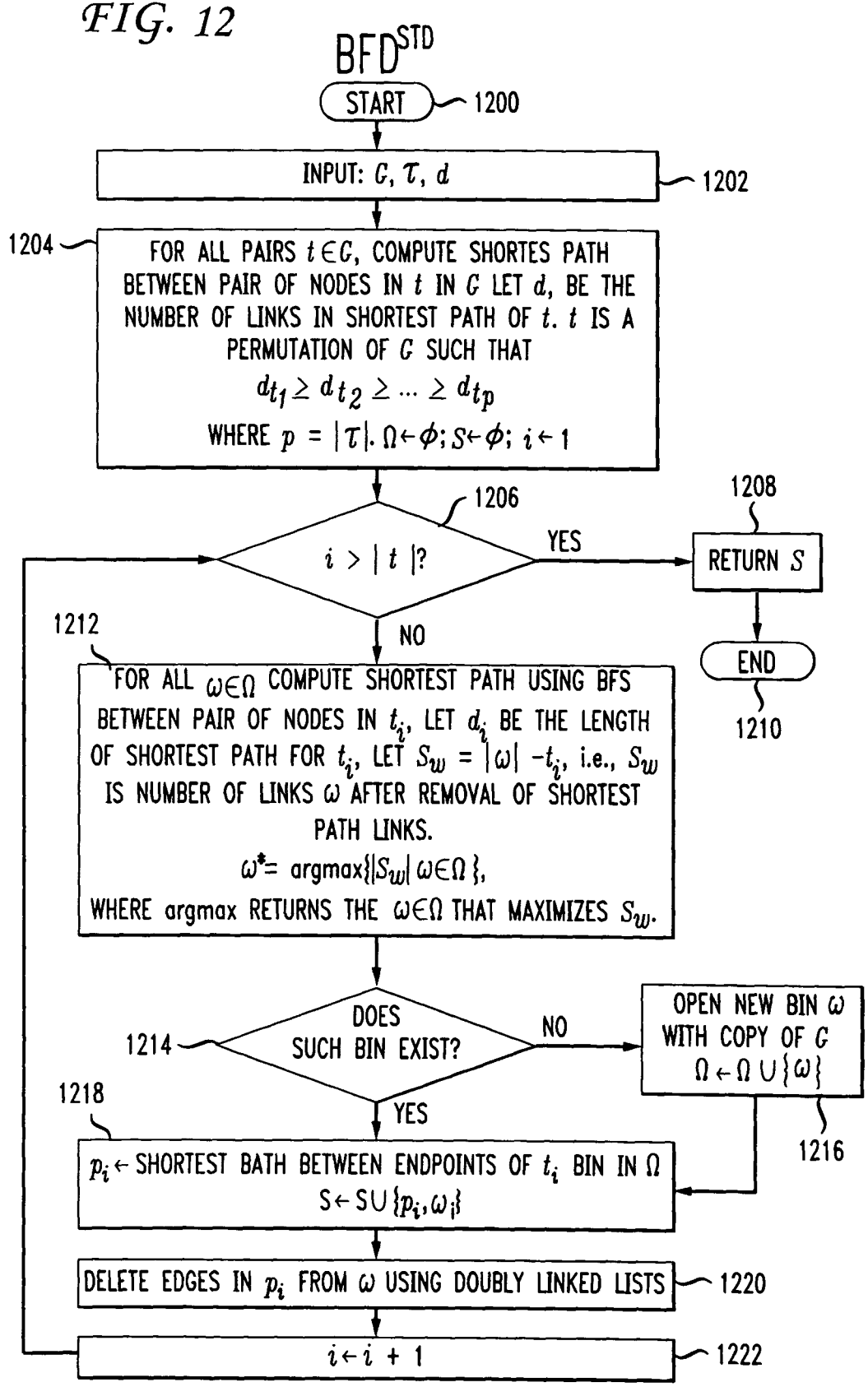
FIG. 12 is a flowchart of a $BFD^{STD}$ method in accordance with an aspect of the present invention.

FIG. 12 is a flowchart of a $BFD^{STD}$ method in accordance with an aspect of the invention. In step 1200, the procedure starts. In step 1202, the following are input: graph G=[V, E], ξ and d. In step 1204, for all pairs t ∈ G, compute shortest path between pair of nodes in t in G and let $d_t$ be the number of links in the shortest path of t, where t is a permutation of G such that $d_{t_1} ≥ d_{t_2} ≥ ... ≥ d_{t_p}$ and where p=|τ|, initialize: Ω←∅; S←∅; i←1. If i>|t| at 1206, then the solution S is returned at block 1208 and the procedure terminates at block 1210. If the answer at step 1206 is negative, then step 1212 calculates for all bins ω in Ω, the shortest path using a BFS between pairs of nodes in $t_i$, where $d_i$ is the length of shortest path for $t_i$. Let $S_w=|ω|-t_i$, i.e., $S_w$ is number of links in ω after removal of shortest path links, and ω*=argmax{$S_w|ω ∈ Ω$}, where argmax returns the ω ∈ ω that maximizes $S_w$. If no such bin ω exists at step 1214, then step 1216 assigns a new copy of G to a bin ω and updates Ω. At step 1218, the shortest path $p_i$ is computed between endpoints of $t_i$ in bin ω and the solution is updated S←S∪{$p_i,ω_i$}. At step 1220, all edges in $p_i$ are deleted from ω using doubly-linked lists as described above. Step 1222 then increments i and the procedure loops back to step 1206.

Figure 13:
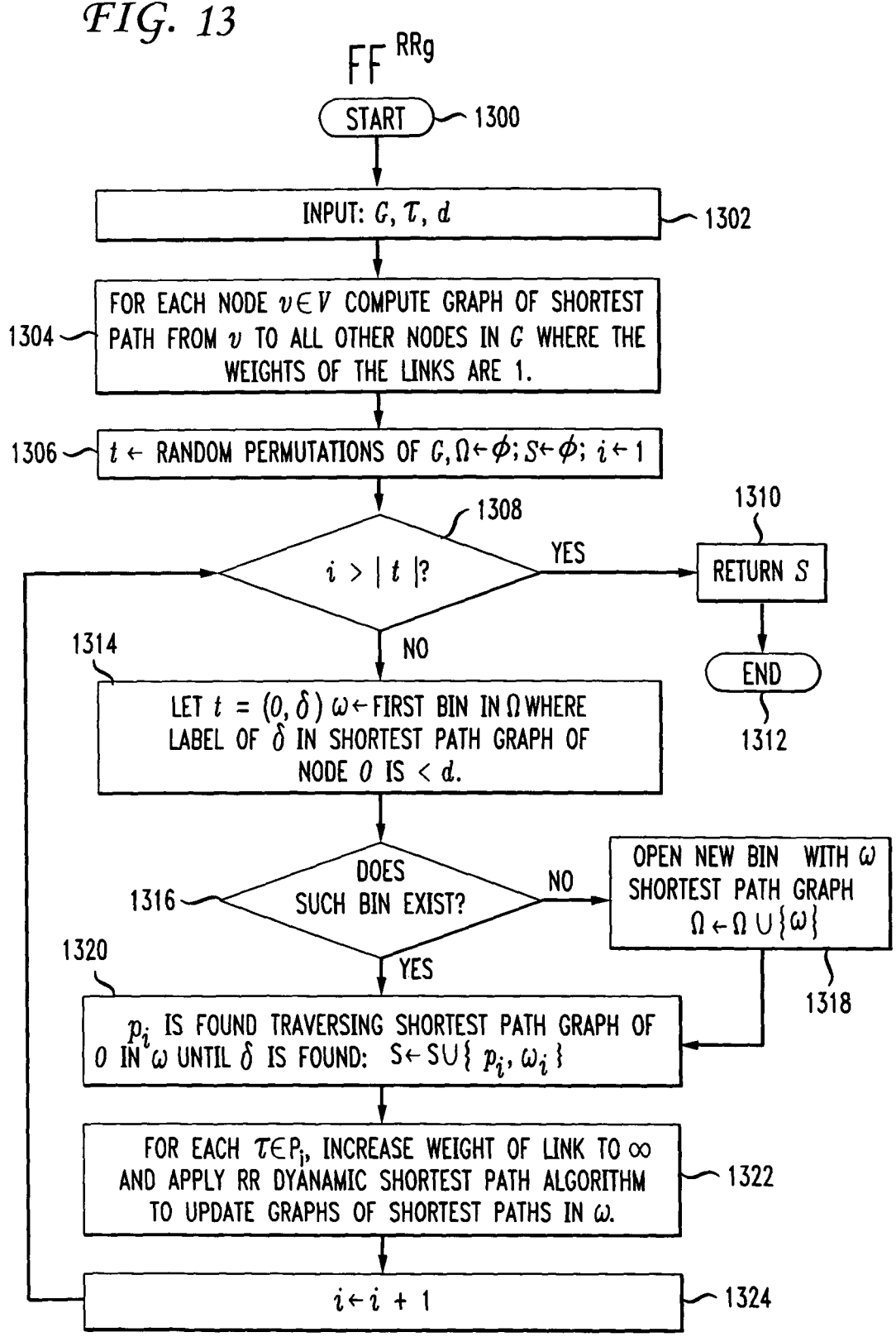
FIG. 13 is a flowchart of a $FF^{RRg}$ method in accordance with an aspect of the present invention.

FIG. 13 is a flowchart of a $FF^{RRg}$ method in accordance with an aspect of the invention. In step 1300 the procedure starts. In step 1302, the following are input: graph G=[V, E], τ and d. In step 1304, for each node v ∈ V a graph of shortest paths from v to all other nodes in G is computed, where the weights of all links in G are 1. In step 1306, the following are initialized: t random permutations of G, Ω←∅ (empty set), Solution S←∅ (empty set), i←1. If i>|t| at 1308, then the solution S is returned at block 1310 and the procedure terminates at block 1312. If the answer at step 1308 is negative, then at step 1314 let t=(O,δ) and ω←first bin in Ω where the label of δ in the shortest path graph of node O is <d. If no such bin ω exists at step 1316, then step 1318 opens a new bin ω with the shortest path graph and updates Ω. At step 1320, the shortest path $p_i$ is computed by traversing the shortest path graph of node O in bin ω until δ is found and the solution is updated S←S∪{$p_i,ω_i$}. In step 1322, for each link τ ∈ $p_i$ the weight of the link is increased to ∞ to remove the link and the RR dynamic shortest path algorithm is applied to update the graphs of shortest paths in ω. Step 1324 then increments i and the procedure loops back to step 1308.

Figure 14:
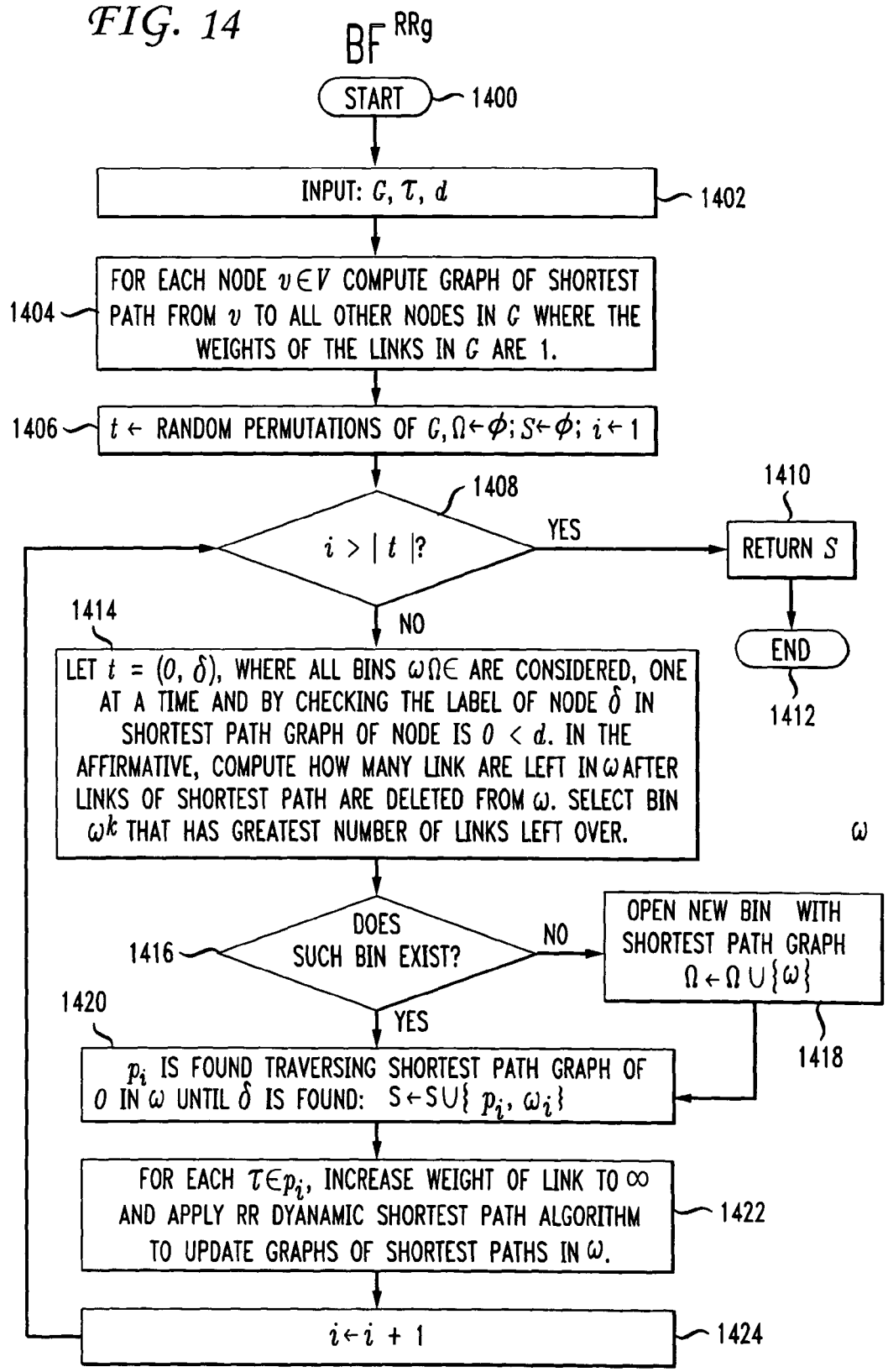
FIG. 14 is a flowchart of a $BF^{RRg}$ method in accordance with an aspect of the present invention.

FIG. 14, a flowchart of a $BF^{RRg}$ method in accordance with an aspect of the invention. In step 1400 the procedure starts. In step 1402, the following are input: graph G=[V, E], τ and d. In step 1404, for each node v ∈ V a graph of shortest paths from v to all other nodes in G is computed, where the weights of all links in G are 1. In step 1406, the following are initialized: t←random permutations of G, ω←∅ (empty set), Solution S←∅ (empty set), i←1. If i>|t| at 1408, then the solution S is returned at block 1410 and the procedure terminates at block 1412. If the answer at step 1408 is negative, then at step 1414 let t=(O,δ) where all bins ω ∈ Ω are considered one at a time, where the label of δ in the shortest path graph of node O is <d. In the affirmative, compute how many links are left in ω after the links of the shortest path are removed from ω and select bin $ω^k$ that has the greatest number of links left over. If no such bin ω exists at step 1416, then step 1418 opens a new bin ω with the shortest path graph and updates Ω. At step 1420, the shortest path $p_i$ is computed by traversing the shortest path graph of node O in bin ω until δ is found and the solution is updated S←S∪{$p_i,ω_i$}. In step 1422, for each link τ ∈ $p_i$ the weight of the link is increased to ∞ to remove the link and the RR dynamic shortest path algorithm is applied to update the graphs of shortest paths in ω. Step 1424 then increments i and the procedure loops back to step 1408.

It will be appreciated by those skilled in the art that methods using $FF^{RRt}$ and $BF^{RRt}$ are identical to those described above for $FF^{RRg}$ and $BF^{RRg}$ except that the tree of shortest paths (see FIG. 8) is used in lieu of the graph of shortest paths and a RR algorithm for updating shortest path trees is used instead of the RR algorithm for updating shortest path graphs.

Figure 15:
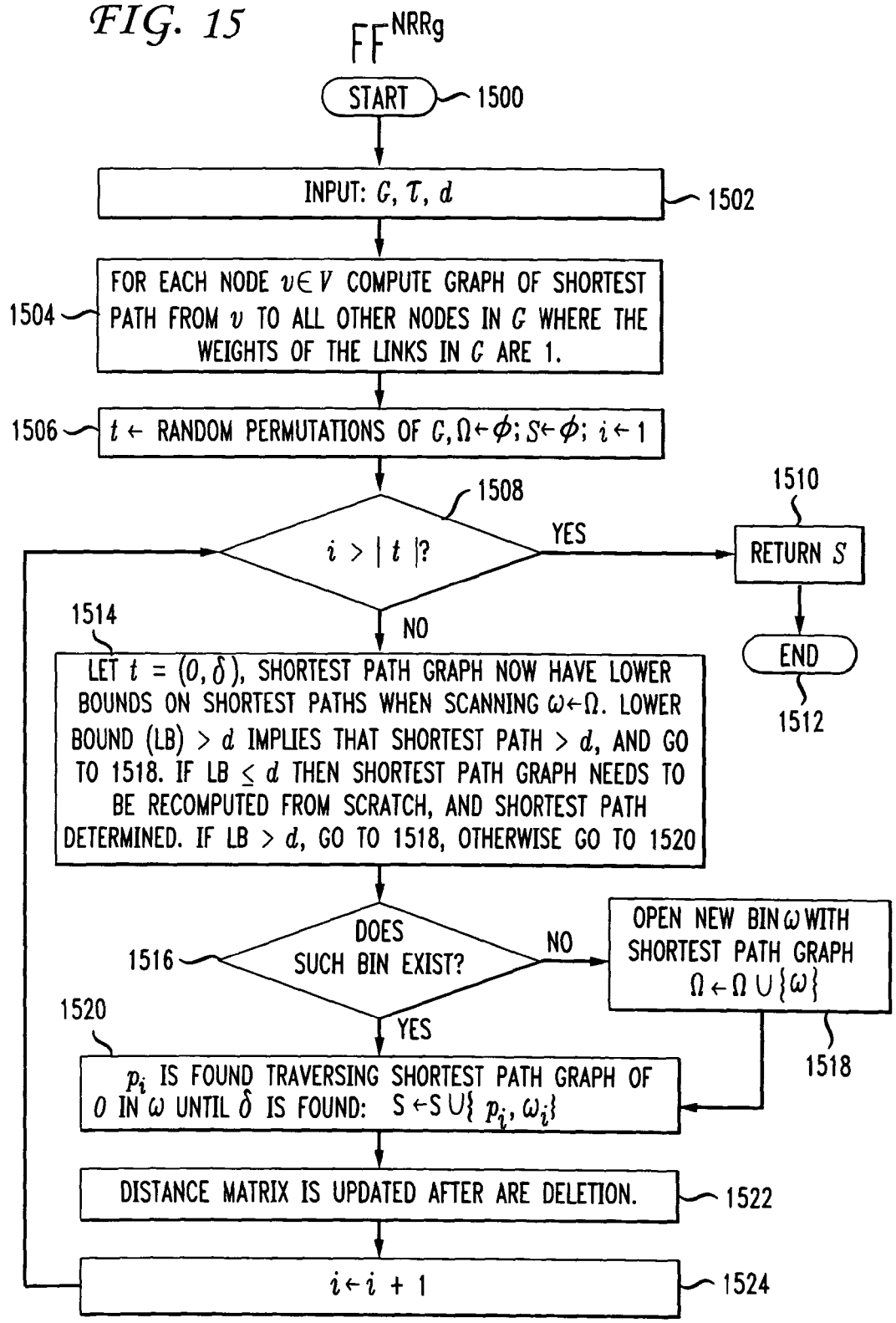
FIG. 15 is a flowchart of a $FF^{NRRg}$ method in accordance with an aspect of the present invention.

FIG. 15 is a flowchart of a $FF^{NRRg}$ method in accordance with an aspect of the present invention. The method is similar to the one depicted in FIG. 13, except the shortest path graph now has a lower bound (LB) and is not dynamically updated. Only the distance matrix is updated after arc deletion. In step 1500, the procedure starts. In step 1502, the following are input: graph G=[V, E], τ and d. In step 1504, for each node v ∈ V a graph of shortest paths from v to all other nodes in G is computed, where the weights of all links in G are 1. In step 1506, the following are initialized: t←random permutations of G, Ω←∅ (empty set), Solution S←∅ (empty set), i←1. If i>|t| at 1508, then the solution S is returned at block 1510 and the procedure terminates at block 1512. If the answer at step 1508 is negative, then at step 1514, let t=(O,δ) and the shortest path graph now has a LB on shortest paths when scanning ω ∈ ω. A LB>d implies that the shortest path is greater than d and thus no such bin exists at step 1516. Thus, at step 1518 a new bin ω is created with the shortest path graph and Ω is updated. Going back to step 1514, for a LB≤d the shortest path graph is recomputed from scratch and control jumps to step 1520 where the shortest path $p_i$ is computed by traversing the shortest path graph of node O in bin ω until δ is found and the solution is updated S←S∪{$p_i$,ω_$i$}. In step 1522, the distance matrix is updated after arc deletion. Step 1524 then increments i and the procedure loops back to step 1508.

Figure 16:
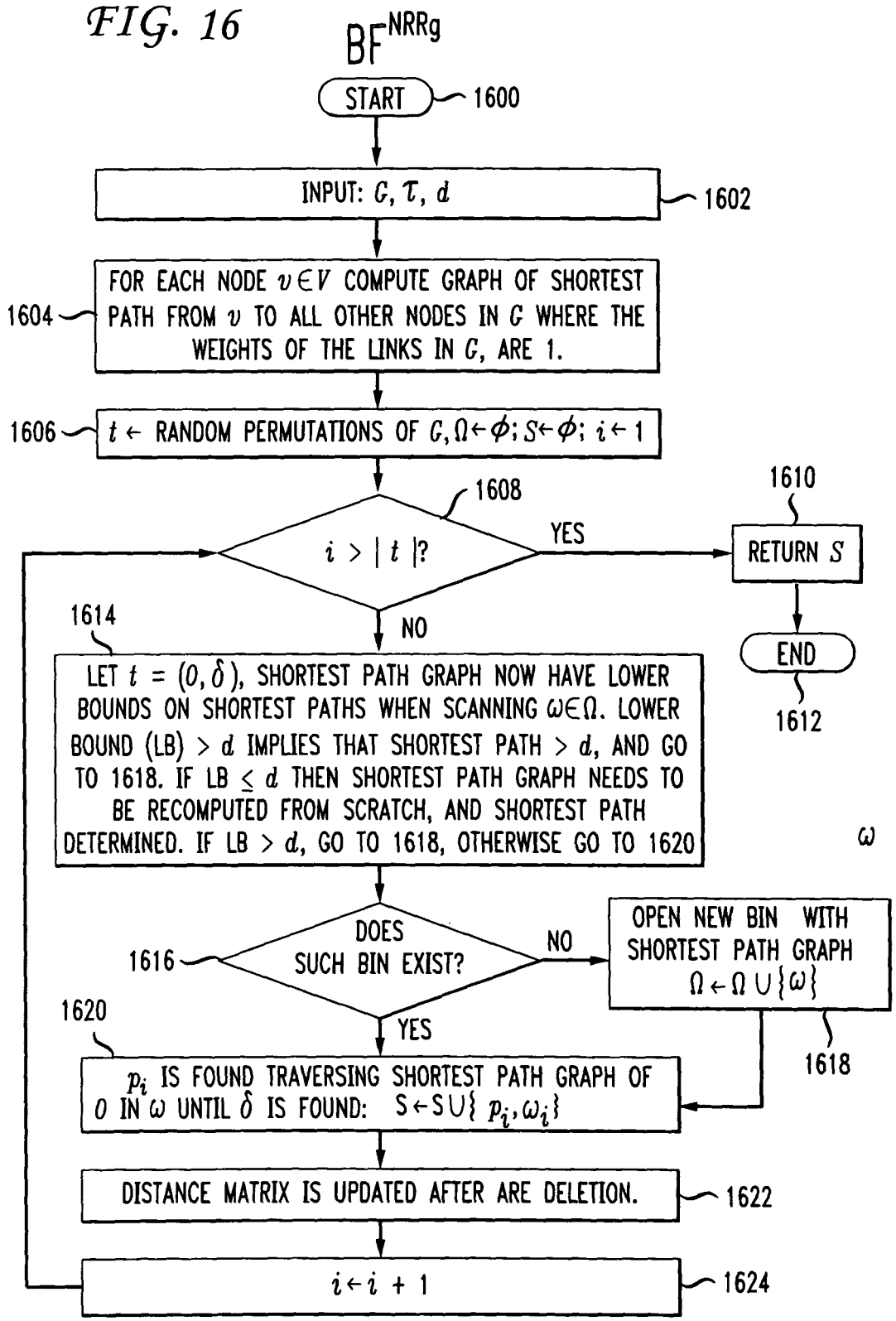
FIG. 16 is a flowchart of a $BF^{NRRg}$ process in accordance with an aspect of the present invention.

FIG. 16 is a flowchart of a $BF^{NRRg}$ process in accordance with an aspect of the invention. In step 1600, the procedure starts. In step 1602, the following are input: graph G=[V, E], τ and d. In step 1604, for each node v ∈ V a graph of shortest paths from v to all other nodes in G is computed, where the weights of all links in G are 1. In step 1606, the following are initialized: t←random permutations of G, Ω←Ø (empty set), Solution S←Ø (empty set), i←1. If i>|t| at 1608, then the solution S is returned at block 1610 and the procedure terminates at block 1612. If the answer at step 1608 is negative, then at step 1614, let t=(O,δ) and the shortest path graph now has a LB on shortest paths when scanning all bins ω ∈ Ω one at a time. A LB>d implies that the shortest path is greater than d and thus no such bin exists at step 1616. Thus, at step 1618 a new bin ω is created with the shortest path graph and Ω is updated. Going back to step 1614, for a LB≤d the shortest path graph is recomputed from scratch and control jumps to step 1620 where the shortest path $p_i$ is computed by traversing the shortest path graph of node O in bin ω until δ is found and the solution is updated S←S∪{$p_i$,ω_$i$}. In step 1622, the distance matrix is updated after arc deletion. Step 1624 then increments i and the procedure loops back to step 1608.

It will be appreciated by those skilled in the art that methods using $FF^{NRRt}$ and $BF^{NRRt}$ are identical to those described above for $FF^{NRRg}$ and $BF^{NRRg}$ except that the tree of shortest paths (see FIG. 8) is used in lieu of the graph of shortest paths and a NRR algorithm for updating shortest path trees is used instead of the NRR algorithm for updating shortest path graphs.

Four sets of testbed instances were used in computational experiments. Set X was randomly generated as discussed in N. Skorin-Kapov. Sets Y and Z are proposed as part of the present invention. Finally, set W is a collection of the most studied realistic instances in the literature, together with two new instances also proposed as part of the present invention. All network topologies are connected and each link corresponds to a pair of bidirected fibers. The traffic matrices are asymmetric, i.e. there might be a lightpath request from a node i to a node j and not from j to i. A description of each set is presented below.

The set X of instances was randomly generated exactly as discussed in N. Skorin-Kapov. The instances have 100 nodes, the probability $P_e$ that there is a link between a pair of nodes is equal to 0.03, 0.04, and 0.05, and the probability $P_l$ that there is a connection between a pair of nodes is equal to 0.2, 0.4, 0.6, 0.8, and 1.0. The networks were randomly generated and only connected networks were considered. Fifteen groups of five instances each were created, combining each possible pair of values for $P_e$ and $P_l$.

It is observed that set X is mostly made up of easy instances. This is due to two structural characteristics that are present in most of its instances. First, there are nodes incident to only one link whose connections are all routed through the same link. Second, there are weakly connected components, i.e. disjoint subsets of nodes that are connected by only one link. Therefore, all connections whose endnodes are in different weakly connected components must be routed through the same link. These characteristics may imply high lower bounds on the number of wavelengths necessary to establish the set of lightpath requests. For most of the instances in set X, a solution with this number of wavelengths can be easily found.

As an attempt to generate harder random instances, set Y is proposed. Networks in this set were randomly generated with the same number of nodes and the same values of $P_e$ and $P_l$ used for the instances in set X. However, only networks whose node degrees are greater than or equal to 2 when $P_e$ is equal to 0.04 and 0.05 were considered, and the diameter of the networks were restricted to 5, 6, and 7 for instances with $P_e$ equal to 0.05, 0.04, and 0.03, respectively. As before, fifteen groups of five instances each were randomly generated, combining each possible pair of values for $P_e$ and $P_l$. The traffic matrices are the same used for the instances in set X.

Figures 17, 18:
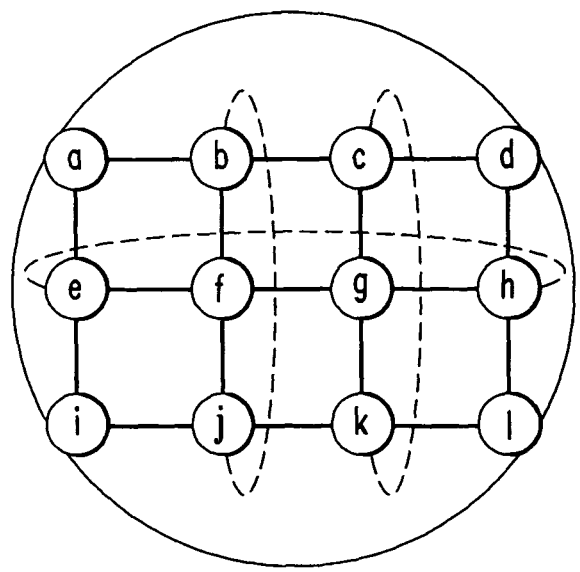
FIG. 17 is an example of a 3×4 grid topology in accordance with an aspect of the present invention.
FIG. 18 is a table of test set W in accordance with an aspect of the present invention.
Figure 22B:
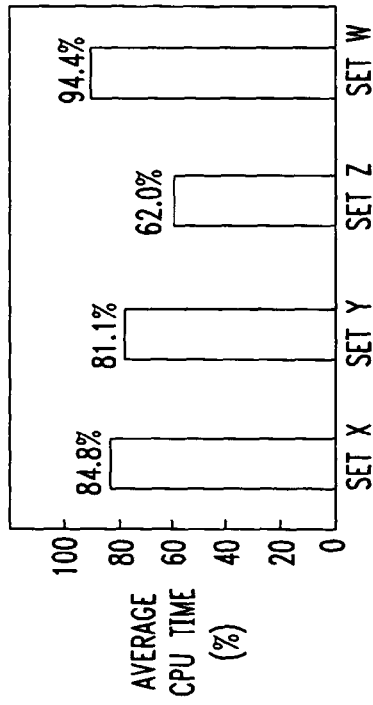
FIGS. 22a. 22b, 22c and 22d and show graphs of average CPU times for heuristics for instance sets X, Y, Z and W in accordance with aspects of the present invention.
Figure 22D:
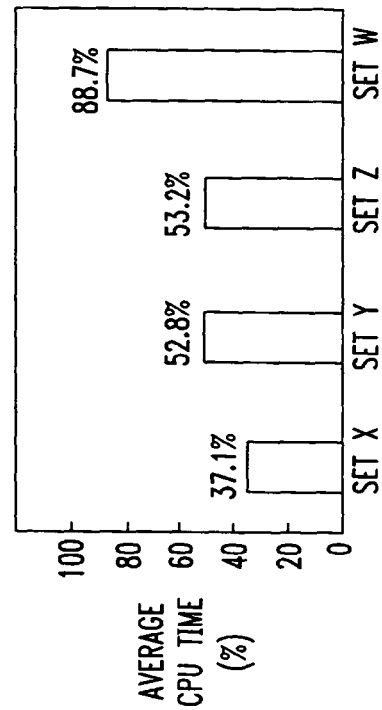
Figure 22A:
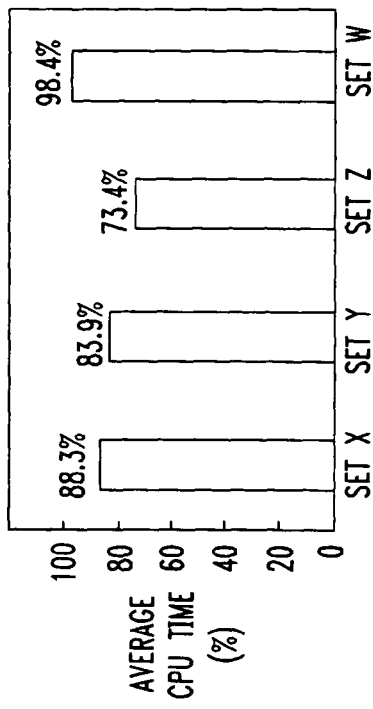
Figure 22C:
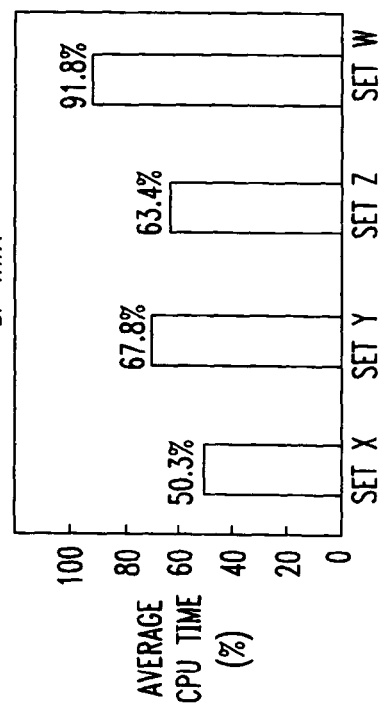

Instances in test set Z are built on n×m grids embedded on the torus. Each node is connected only to its nearest four nodes. FIG. 17 is an example of a 3×4 grid topology. Five grid networks with approximately 100 nodes (10×10, 8×13, 6×17, 5×20, 4×25) were generated. For each of them, five traffic matrices are randomly generated with the probability $P_l$ that there is a connection between a pair of nodes being equal to 0.2, 0.4, 0.6, 0.8, and 1.0.

Finally, set W is a collection of the most studied realistic instances in the literature, together with two new instances ATT and ATT2 whose topologies and traffic matrices resemble those of real telecommunication networks. The topology of the Finland network was obtained from the paper by E. Hyytia and its traffic matrix was the same used as discussed in the paper by T. F. Noronha. Networks EON, NSF, and NSF2 and their respective traffic matrices presented by B. Jaumard. Network and traffic data sets for optical network optimization, online reference in http://users.encs.concordia.ca/~bjaumard, last visited on Jan. 3, 2008. FIG. 18 is a table of a test set W. The first three columns of FIG. 18 display the name, the number of nodes, and the number of links in each instance of set W, respectively. The total number of lightpaths and the maximum number of lightpaths starting from the same node are given in the fourth and fifth columns, respectively.

$FF\text{-}RWA^{STD}$, $FF\text{-}RWA^{RRg}$, $FF\text{-}RWA^{RRt}$, $FF\text{-}RWA^{NRRg}$, and $FF\text{-}RWA^{NRRt}$ denote the implementations of the heuristic FF-RWA using algorithms STD, RRg, RRt, NRRg, and NRRt, respectively. The same notation is extended to the other heuristics. The algorithms were coded in C++ and compiled with the GNU GCC version 4.0.3 with no compiler code optimization. The experiments were performed on a 2.8 GHz Pentium IV with 1 Gb of RAM memory using Linux Ubuntu 6.10. CPU times are reported in seconds. The quality of the heuristics is displayed as the gap (UB−LB)/LB between the cost UB of the solution provided by the heuristic and a lower bound LB for the cost of the optimal solution, which is calculated as suggested in the paper by D. Bannerjee.

The first experiments evaluate and compare the performance of $FF\text{-}RWA^{STD}$, $FFD\text{-}RWA^{STD}$, $BF\text{-}RWA^{STD}$, and $BFD\text{-}RWA^{STD}$ for the 187 instances in sets X, Y, Z, and W. Each heuristic was run five times with different seeds for the random number generator algorithm as discussed by L. Schrage, A more portable Fortran random number generator, *ACM Transactions on Mathematical Software*, 5:132-138, 1979.

FIG. 19 shows a table for sets X, Y, Z, and W depicting the average gaps and CPU times for implementations FF-RWA$^{STD}$, FFD-RWA$^{STD}$, BF-RWA$^{STD}$, and BFD-RWA$^{STD}$. The best of the five runs of BFD-RWA$^{STD}$ was optimal for 62 out of the 75 instances in set X with an average gap of 1.2%. This confirms the hypothesis that this set is mostly made up of easy instances. The average solution gaps for the instances in sets Y and Z were greater than or equal to those in the other sets for all the heuristics, which indicates that the instances in sets Y and Z are harder than those in the literature.

FIG. 20a depicts average solution gaps and FIG. 20b shows CPU times for implementations FF-RWA$^{STD}$, FFD-RWA$^{STD}$, BF-RWA$^{STD}$, and BFD-RWA$^{STD}$ in accordance with aspects of the present invention. Algorithm BFD-RWA$^{STD}$ found on average better results than the other heuristics for most of the instances tested. As shown in FIG. 20a, the average gap observed for FFD-RWA (8.7%) is almost 50% larger than that corresponding to BFD-RWA (6.0%). The average gap observed for algorithm FFD-RWA$^{STD}$ was smaller than that for BFD-RWA$^{STD}$ exclusively for set W. However, this occurs because of the huge difference observed for instance ATT, where the FFD-RWA$^{STD}$ gap was 20.0% and the BFD-RWA$^{STD}$ gap was 32.0%. If this instance is excluded from set W, the average gap of FF-RWA$^{STD}$ would be 5.0% and that of BFD-RWA$^{STD}$ would be 4.9%.

As expected, CPU times of the best fit heuristics were greater than those of the first fit heuristics, because each iteration of FF-RWA$^{STD}$ and FFD-RWA$^{STD}$ stops at the first bin in which the lightpath can be routed with less than d arcs, while each iteration of BF-RWA$^{STD}$ and BFD-RWA$^{STD}$ scans all the bins looking for bins where the lightpath fits with the smallest number of arcs. Although solution gaps of BFD-RWA$^{STD}$ were on average smaller than those of the other heuristics, its running times were the longest. However, the maximum CPU times of BFD-RWA$^{STD}$ in set X was 10 seconds, which is much less than the 8 minutes reported in the paper by N. Skorin-Kapov for the implementation in the same set of instances and the same machine. The CPU times of BFD-RWA$^{STD}$ were always less than five seconds for instances in sets Y and Z and never greater than one second for those in set W.

The next experiments evaluated the performance of the heuristics FF-RWA, FFD-RWA, BF-RWA, and BFD-RWA using NRRt, NRRg, RRt, and RRg. The running times are compared with those using the respective standard implementation (STD). For each heuristic and each set of instances, FIG. 21 shows the average CPU times using NRRt, NRRg, RRt, and RRg as a percent deviation of the times using STD (i.e. the times of NRRt, NRRg, RRt, and RRg are divided by the times of STD). Each version of each heuristic was run five times with different seeds for the random number generator algorithm as discussed in the paper by L. Schrage. For all heuristics and instance sets, the implementations using RRt and NRRt were faster than those using RRg and NRRg, respectively. This is due to the fact that updating of SP graphs is more expensive than updating SP trees, and the SP graphs were not dense enough to compensate the trade off. Due to the number of SP graphs that must be updated after an arc deletion, the implementations of FF-RWA, FFD-RWA, BF-RWA, and BFD-RWA using RRt and RRg were slower than their respective implementations using STD.

NRRt was the best algorithm for updating the distance matrix. The numerical results for heuristics FF-RWA$^{NRRt}$, FFD-RWA$^{NRRt}$, BF-RWA$^{NRRt}$, and BFD-RWA$^{NRRt}$ displayed in the third column of FIG. 21 are also plotted in FIGS. 22a. 22b, 22c and 22d and show graphs of average CPU times for heuristics for instance sets X, Y, Z and W. With reference to FIGS. 22a-22d, the improvements observed in BF-RWA$^{NRRt}$ and BFD-RWA$^{NRRt}$ are greater than those observed in FF-RWA$^{NRRt}$ and FFD-RWA$^{NRRt}$, when compared with their respective standard implementations. This is due to the fact that the number of SP queries in BF-RWA and BFD-RWA is greater than in FF-RWA and FFD-RWA, while the number of updates is approximately the same. The heuristic that took more advantage of NRRt was BFD-RWA, whose times were shortened, on average, to almost one half of those of BFD-RWA$^{STD}$. The maximum running time of the BFD-RWA$^{NRRt}$ over all the 187 instances tested (including set X) was only 2.2 seconds, which is one quarter of the maximum running time of BFD-RWA$^{STD}$.

In summary, computational experiments showed that BFD-RWA was the best heuristic for the instances tested. The new methods proposed in accordance with the present invention shortened the average and maximum running times of BFD-RWA by 57% and 25%, respectively, with respect to those of the standard implementation. The maximum computation times of the best implementation of BFD-RWA was less than three seconds, while the times reported for the same heuristic in the paper by N. Skorin-Kapov were up to eight minutes on the same instances and the same Pentium IV 2.8 GHz computer.

The present invention may be implemented by program modules that are executed by a computer. Generally, program modules include routines, objects, components, data structures and the like that perform particular tasks or implement particular abstract data types. The term "program" as used herein may connote a single program module or multiple program modules acting in concert. The invention may be implemented on a variety of types of computers, including personal computers (PCs), hand-held devices, multi-processor systems, microprocessor-based programmable consumer electronics, network PCs, minicomputers, mainframe computers and the like. The invention may also be employed in distributed computing environments, where tasks are performed by remote processing devices that are linked through a communications network. In a distributed computing environment, modules may be located in both local and remote memory storage devices.

In one embodiment, the invention is directed toward one or more computer systems capable of carrying out the functionality described herein. An exemplary computer system of the type known in the art includes one or more processors connected to a communication infrastructure (e.g., a communications bus, cross-over bar, or network). The computer system can include a display interface (e.g. a graphics card) that allows graphics, text, and other data from the communication infrastructure or from a frame buffer to be displayed on a display unit. The computer system also includes a main memory, preferably random access memory (RAM), and may also include a secondary memory. The secondary memory may include, for example, a hard disk drive and/or a removable storage drive. The removable storage drive has read/write functionality onto removable storage media having stored therein computer software and/or data. In alternative embodiments, secondary memory may include other similar devices for allowing computer programs or other instructions to be loaded into the computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to the computer system. The computer system may also include a communications interface allowing software and data to be transferred between computer system and external devices. Examples of a communications interface may include a modem, a network interface (such as an Ethernet card), a communications port, a Personal Computer Memory Card International Association (PCMCIA) slot and card, etc. Software and data transferred via the communications interface are in the form of signals which may be electronic, electromagnetic, optical or other signals capable of being received by the communications interface. These signals are provided to communications interface via a communications path or channel, which carries the signals and may be implemented using wire or cable, fiber optics, a telephone line, a cellular link, a radio frequency (RF) link and/or other communications channels. Computer programs (also referred to as computer control logic) are stored in a main memory and/or secondary memory. Computer programs may also be received via the communications interface. Computer programs, when executed, enable the computer system to perform the features of the present invention, as discussed herein. Accordingly, such computer programs represent controllers of the computer system. In an embodiment where the invention is implemented using software, the software may be stored in a computer program product and loaded into the computer system using a removable storage drive, hard drive, or communications interface. The control logic (software), when executed by the processor causes the processor to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s). In one exemplary embodiment, the system for the present invention may be implemented, for example, as a Microsoft.net® desktop application program (Microsoft.net® is made by Microsoft® Corporation of Redmond, Wash.), which may reside on a computer hard drive, database or other repository of data, or be uploaded from the Internet or other network (e.g., from a PC, minicomputer, mainframe computer, microcomputer, telephone device, PDA, or other network device having a processor and input and/or output capability). Any available software tool capable of implementing the concepts described herein may be used to implement the system and method of the present invention. The method and system of the present invention may also be implemented as an application-specific add-on to a program, or as a standalone application.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A method for wavelength assignment in an optical network where each wavelength is represented as a copy of a graph that represents a physical topology of the optical network comprising:

packing lightpaths of a wavelength of the optical network using a minimum number of copies of the graph by removing arcs between nodes, in a particular lightpath route, from the graph in constant time, wherein lightpaths arc-disjointly routed in a same copy of the graph are assigned a same wavelength;

representing the graph according to an n×n distance matrix in which each entry is a value of a shortest path between two corresponding nodes in the graph, and wherein removing arcs comprises:

representing removal of an arc by obtaining an address in time O(1) of a cell in a doubly-linked list of cells corresponding to arcs in a particular copy of the graph; and modifying the cell at the address, wherein the cell corresponds to a node from which the arc originates in the graph; and updating the graph and the n×n distance matrix to reflect a respective arc removal.

2. The method of claim 1, further comprising:
maintaining an array pointing to an address of each cell in an adjacency list.

3. The method of claim 1, wherein packing lightpaths of a wavelength of the optical network using a minimum number of copies of the graph comprises:
removing arcs between nodes from the graph using a first-fit method.

4. The method of claim 1, wherein packing lightpaths of a wavelength of the optical network using a minimum number of copies of the graph comprises:
removing arcs between nodes from the graph using a first-fit-decreasing method.

5. The method of claim 1, wherein packing lightpaths of a wavelength of the optical network using a minimum number of copies of the graph comprises:
removing arcs between nodes from the graph using a best-fit method.

6. The method of claim 1, wherein packing lightpaths of a wavelength of the optical network using a minimum number of copies of the graph comprises:
removing arcs between nodes from the graph using a best-fit-decreasing method.

7. A method for wavelength assignment where each wavelength is represented as a copy of a graph of shortest paths that represents a physical topology of an optical network, comprising:

probing, at a computing device, the graph of shortest paths to determine hop-count shortest paths between nodes in the optical network in constant time; and packing lightpaths of a wavelength of the optical network using a minimum number of bins by removing arcs between nodes, in a particular lightpath route, from the graph of shortest paths in constant time by increasing a weight of each arc to be removed to ∞, wherein each bin corresponds to a respective copy of the graph of shortest paths; and representing the graph of shortest paths according to an n×n distance matrix in which each entry is a value of a shortest path between two corresponding nodes in the graph of shortest paths;

wherein lightpaths arc-disjointly routed in a same copy of the graph of shortest paths are assigned a same wavelength, wherein removing arcs comprises:

representing removal of an arc by obtaining an address in time O(1) of a cell in a doubly-linked list of cells corresponding to arcs in a particular copy of the graph of shortest paths; and modifying the cell at the address, wherein the cell corresponds to a node from which the arc originates in the graph of shortest paths.

8. The method of claim 7, further comprising:
updating the copy of the graph of shortest paths by a Ramalingam and Reps method and;
updating the n×n distance matrix to reflect a respective arc removal.

9. The method of claim 8, wherein packing lightpaths of a wavelength of the optical network using a minimum number of bins comprises:
removing arcs between nodes from the graph of shortest paths using a first-fit method.

10. The method of claim 8, wherein packing lightpaths of a wavelength of the optical network using a minimum number of bins comprises:
removing arcs between nodes from the graph of shortest paths using a first-fit-decreasing method.

11. The method of claim 8, wherein packing lightpaths of a wavelength of the optical network using a minimum number of bins comprises:
removing arcs between nodes from the graph of shortest paths using a best-fit method.

12. The method of claim 8, wherein packing lightpaths of a wavelength of the optical network using a minimum number of bins comprises:
removing arcs between nodes from the graph of shortest paths using a best-fit-decreasing method.

13. The method of claim 8, wherein the n×n distance matrix gives a lower bound of a shortest path between any two nodes in the graph of shortest paths in constant time, the method further comprising:
opening a new bin with the graph of shortest paths in response to determining that the lower bound is greater than a diameter in the graph of shortest paths; and
updating the graph of shortest paths by the Ramalingam and Reps method in response to determining that the lower bound is less than or equal to the diameter.

14. A method for wavelength assignment in an optical network where each wavelength is represented as a copy of a shortest path tree that represents a physical topology of the network, comprising:
probing, at a computing device, the shortest path tree to determine hop-count shortest paths between nodes in the optical network in constant time; and
packing lightpaths of a wavelength of the optical network using a minimum number of bins by removing arcs between nodes, in a particular lightpath route, from the shortest path tree in constant time by increasing a weight of each arc to be removed to $\infty$, wherein each bin corresponds to a respective copy of the shortest path tree; and
representing the shortest path tree according to an n×n distance matrix in which each entry is a value of a shortest path between two corresponding nodes in the shortest path tree;
wherein lightpaths arc-disjointly routed in a same copy of the shortest path tree are assigned a same wavelength, wherein removing arcs comprises:
representing removal of an arc by obtaining an address in time $O(1)$ of a cell in a doubly-linked list of cells corresponding to arcs in a particular copy of the shortest tree path; and
modifying the cell at the address, wherein the cell corresponds to a node from which the arc originates in the shortest tree path.

15. The method of claim 14, further comprising: updating the shortest path tree by a Ramalingam and Reps method; and
updating the n×n distance matrix to reflect a respective arc removal.

16. The method of claim 15, wherein packing lightpaths of a wavelength of the optical network using a minimum number of bins comprises:
removing arcs between nodes from the shortest path tree using a first-fit method.

17. The method of claim 15, wherein packing lightpaths of a wavelength of the optical network using a minimum number of bins comprises:
removing arcs between nodes from the shortest path tree using a first-fit-decreasing method.

18. The method of claim 15, wherein packing lightpaths of a wavelength of the optical network using a minimum number of bins comprises:
removing arcs between nodes from the shortest path tree using a best-fit method.

19. The method of claim 15, wherein packing lightpaths of a wavelength of the optical network using a minimum number of bins comprises:
removing arcs between nodes from the shortest path tree using a best-fit-decreasing method.

20. The method of claim 15, wherein the n×n distance matrix gives a lower bound of a shortest path between any two nodes in the shortest path tree in constant time, the method further comprising:
opening a new bin with the copy of the shortest paths tree in response to determining that the lower bound is greater than a diameter in the copy of the shortest path tree; and
updating the copy of the shortest path tree by the Ramalingam and Reps method in response to determining that the lower bound is less than or equal to the diameter.

* * * * *